United States Patent [19]

Pohlman, III et al.

[11] 4,449,184

[45] May 15, 1984

[54] EXTENDED ADDRESS, SINGLE AND MULTIPLE BIT MICROPROCESSOR

[75] Inventors: William Pohlman, III, Los Gatos; Bruce W. Ravenel, III, Sunnyvale; James F. McKevitt, III, San Jose; Stephen P. Morse, San Francisco, all of Calif.

[73] Assignee: Intel Corporation, Santa Clara, Calif.

[21] Appl. No.: 322,471

[22] Filed: Nov. 18, 1981

Related U.S. Application Data

[62] Division of Ser. No. 873,777, Jan. 31, 1984, Pat. No. 4,363,091.

[51] Int. Cl.³ .................................................. G06F 9/38
[52] U.S. Cl. ..................................................... 364/200
[58] Field of Search ... 364/200 MS File, 900 MS File

[56] References Cited

U.S. PATENT DOCUMENTS

| | | |
|---|---|---|
| 3,793,631 | 2/1974 | Silverstein et al. ................. 364/200 |
| 4,050,058 | 9/1977 | Garlic .................................. 364/200 |
| 4,181,934 | 1/1980 | Marenin .............................. 364/200 |

Primary Examiner—Thomas M. Heckler
Attorney, Agent, or Firm—Blakely, Sokoloff, Taylor & Zafman

[57] ABSTRACT

The addressable memory space within the retrievable capacity of the microprocessor is necessarily limited by the bit length of the address word. This in turn, is limited by the bit length of the word which the microprocessor may compute or manipulate. By appropriate organization of multiple registers, an extended or expanded memory space may be achieved without the necessity of increasing the word length of the digital information manipulated by the microprocessor. In addition, the microprocessor can be fabricated to be capable of both eight bit and sixteen bit operation by appropriate organization and coordination of a plurality of register files. By virtue of this register file organization and coordination additional improved operations may be achieved, such as direct coupling by the microprocessor between the memory and separate dedicated data processing chips, simplified string instructions and the condensation of entire classes of instructions into single generic instruction formats.

8 Claims, 4 Drawing Figures

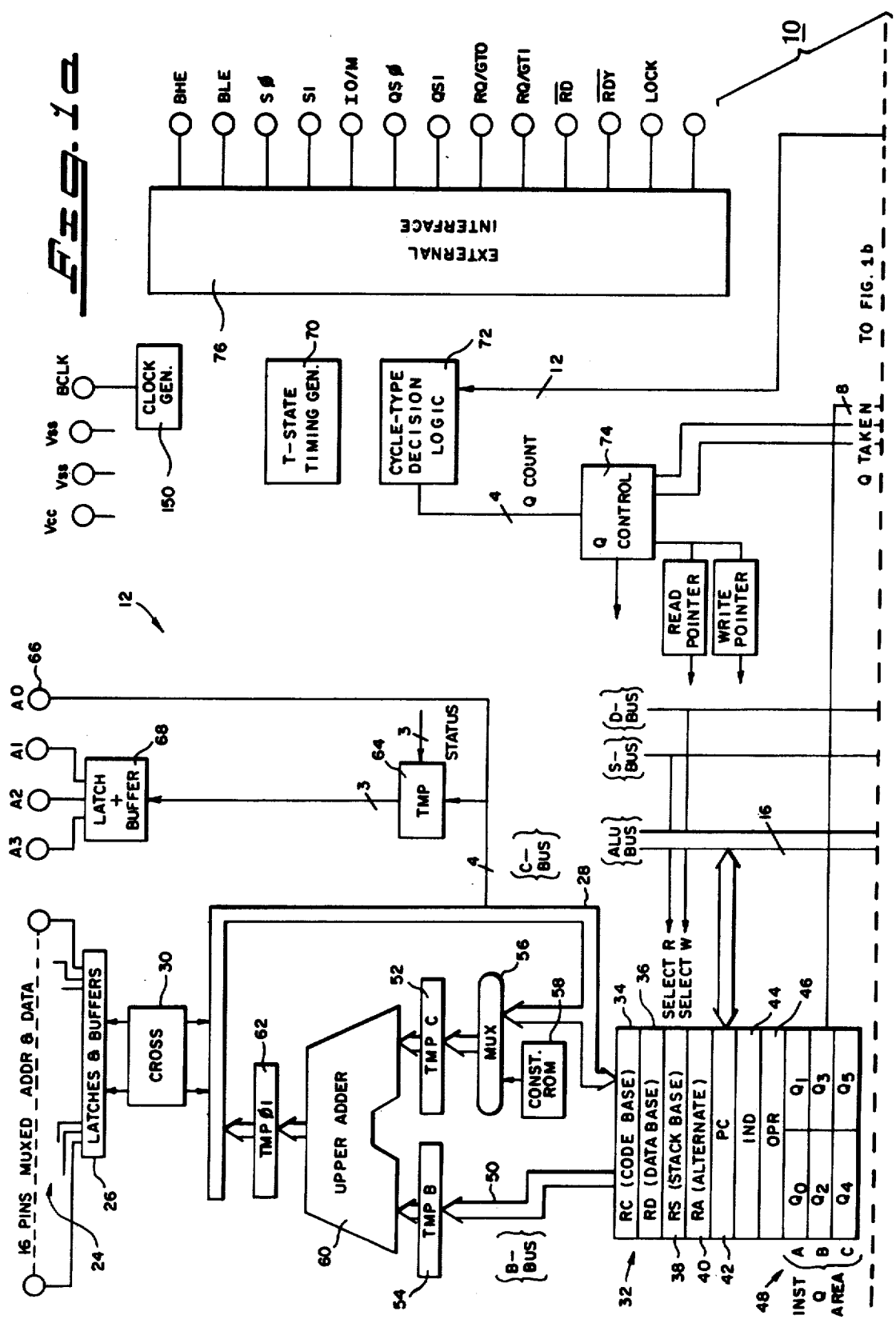

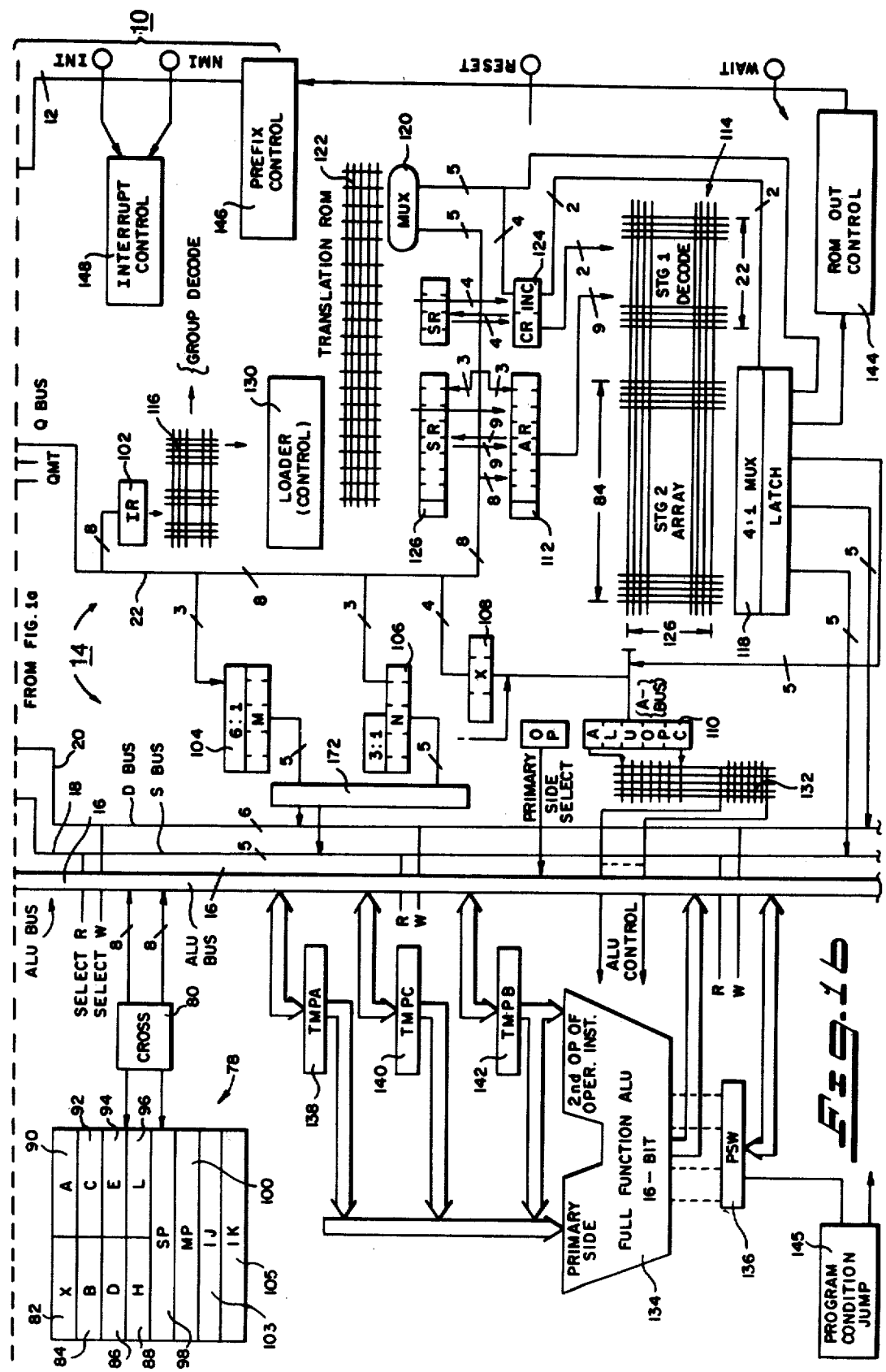

EXTENDED ADDRESS, SINGLE AND MULTIPLE BIT MICROPROCESSOR

This is a division of application Ser. No. 873,777, filed Jan. 31, 1978 now U.S. Pat. No. 4,363,091.

BACKGROUND OF THE INVENTION

1. Field of the Present Invention

The present invention relates to the field of microprocessors and in particular relates to the organization of microprocessors as that organization limits or relates to the use and structure of microprocessor instructions.

2. Description of the Prior Art

Since their inception, digital computers have continuously become more efficient, expanding into new applications with each major technological improvement. The advent of minicomputers allow digital computers to be included as a permanent part of various process control systems. Unfortunately, the size and cost of minicomputers in dedicated applications has limited their use. Capacity and ability of such dedicated microprocessors has been due in part to a fixed or limited word length upon which the operation of the microprocessor is based.

Thus, prior art microprocessors typically assumed a certain memory structure or by reason of their internal organization were subject to certain limitations with respect to the manner and means in which digital information could be stored and retrieved from a memory and later manipulated within the microprocessor itself. These limitations led to restrictions as to how multiple byte words were to be stored within a memory with respect to word length boundaries, and restrictions as to the structure of instructions which were decoded in the microprocessor to manipulate the digital information. As a result, instruction sets for microprocessors necessarily were limited in the power of the instruction, and in the number of instructions which could be accommodated. Typically, prior art microprocessors, by virtue of their architectural organization, would require a large number of distinct instructions or comparatively complex instructions in order to perform relatively simple tasks.

The present invention, as disclosed herein, overcomes each of these disadvantages in the manner and by the means as set forth in the following brief summary.

BRIEF SUMMARY OF THE INVENTION

The present invention is an improvement in a data processing system. The data processing system includes a memory unit for storing digital information. Such digital information includes instructions, addresses, and data. The data processing system also includes a processor unit for processing the digital information communicated between the processor unit and the memory unit. The improvement comprises a first plurality of registers in the processor unit for storing bytes of digital information. A second plurality of registers is also included in the processor unit for storing words of digital information. The word is an integral number of bytes digital information. At least some of the second plurality of registers are relocation registers wherein each of the relocation registers has associated therewith a plurality of assumed bits to extend the effective bit length of the word in each such relocation register. As a result, the data processing system may be afforded an extended memory space beyond the word length limitation of the first and second plurality of registers.

The present invention may also be viewed as a data processing system comprised of a memory having an addressable memory space used for storing digital information, a first plurality of registers, a second plurality of registers, an arithmetic logic unit, and a control means. The first plurality of registers temporarily stores a corresponding plurality of single bytes. The second plurality of registers temporarily stores a corresponding plurality of multiple byte words having a maximum bit length. The arithmetic logic unit selectively performs arithmetic and logical operations upon the digital information. The control means is coupled to the memory, the first and second plurality of registers and the arithmetic logic unit to selectively transfer digital information therebetween and to selectively generate a plurality of discrete command signals thereto in response to a plurality of instructions. The control means includes an extended address means for generating an extended digital word having a bit length greater than the maximum bit length.

One way in which the extended address means generates the extended digital word, typically used for addressing in an extended memory space, is by summing selected bits of the contents of a selected one of the second plurality of registers with a predetermined digital word. The remaining unselected bits of the contents of the selected register are then placed as a prefix or suffix with respect to the sum to form an extended digital word. In the case where it is a prefix, carries may ripple through the prefix. The selected register, or relocation register, is selected by the control means in response to an address instruction.

The data processing system of the present invention is used with a conventional memory and comprises an upper control means for transferring digital information to and from the memory and a lower control means for processing the digital information wherein the operation of the upper and lower control means are overlapping and asynchronous. The upper control means includes a file of registers which in turn includes a plurality of registers forming an ordered first-in-first-out queue of registers. Digital instructions obtained from the memory are temporarily stored in the queue until requested by the lower control unit for execution. The queue is filled in whole or in part to allow the lower control unit to run at maximum speed. The lower control unit runs in an overlapping manner in that the data processing system of the present invention processes the digital information in the lower control means by executing an instruction while simultaneously decoding a subsequent instruction. In particular, the upper and lower control means processes single byte and multiple byte instructions. The upper and lower control means has a upper and lower file respectively of single byte and multiple byte registers. The upper and lower file of registers are selectively coupled by a bus which has a plurality of separate bus lines equal in number to the number of bits in the multiple byte register. Selected ones of the upper and lower files of registers are selectively coupled to the bus as a source or destination register by and in response to a plurality of bus registers. The bus registers in turn are responsive to the single byte and multiple byte instructions. By this scheme, the lower control means can execute both single byte and multiple byte instructions without duplication of hardware and in a simple manner.

The lower control means includes an instruction register coupled to the queue. A group decode ROM has its inputs coupled to the instruction register. The group decode ROM generates a plurality of group decode signals which are indicative of the genera of the single byte and multiple byte instructions being received and decoded by the lower control means. A microcode address register has inputs coupled to the queue. A microcode address incrementing register is included and is coupled to a microcode ROM. The microcode ROM stores a multiplicity of microcode instructions. The outputs of the microcode ROM are selectively coupled to the first and second file of registers and to an arithmetic and logic unit which may include a plurality of temporary registers and status registers. A loader means selectively enables and loads a byte from the queue into the instruction register and microcode address register. The loader also enables the microcode address incrementing register in microcode ROM. The loader is characterized by having a plurality of cyclic states. The microcode ROM is taken to include a ROM-OUT control means for selectively generating a next-to-the-last clock signal, NXT, on the next to the last clock of a selected plurality of the multiplicity of microcode instructions in the microcode ROM. The signal, NXT, triggers the loader means to recycle through at least part of the plurality of cyclic states.

In addition, the data processing system of the present invention includes a subroutine translation ROM having inputs coupled to the queue and outputs coupled to the microcode ROM. A subroutine translation ROM also has its outputs coupled to the microcode address register and the microcode address incrementing register to load therein a selected microcode address in response to predetermined ones of the output of the microcode ROM. In addition, the subroutine translation ROM may load a selected microcode address into the microcode address register and microcode address incrementing register in response to a selected bit field in the second byte of a multiple byte instruction. The subroutine translation ROM may also have associated therewith, a subroutine register by which the microcode address stored within the microcode address register and microcode address incrementing register may be temporarily stored or saved during a microcode jump.

The data processing system may also include an ALU opcode register having inputs coupled to the queue and outputs coupled to an arithmetic and logic unit included within a lower control means. The ALU opcode register temporarily stores the predetermined bit field from the single byte and multiple byte instructions while the microcode ROM is communicating ALU opcode instructions to the arithmetic and logic unit in response to the second byte of the single and multiple byte instructions.

Many other advantages and benefits result by virtue of the organization recited above and are best understood and will be described in the Detailed Description of the Preferred Embodiments in association with the accompanying figures.

BRIEF DESCRIPTION OF THE DRAWINGS

FIGS. 1A and 1B are a simplified block diagram of the internal organization of a microprocessor incorporating the present invention.

DETAILED DESCRIPTION OF THE PREFERRED EMBODIMENTS

Figure 2:
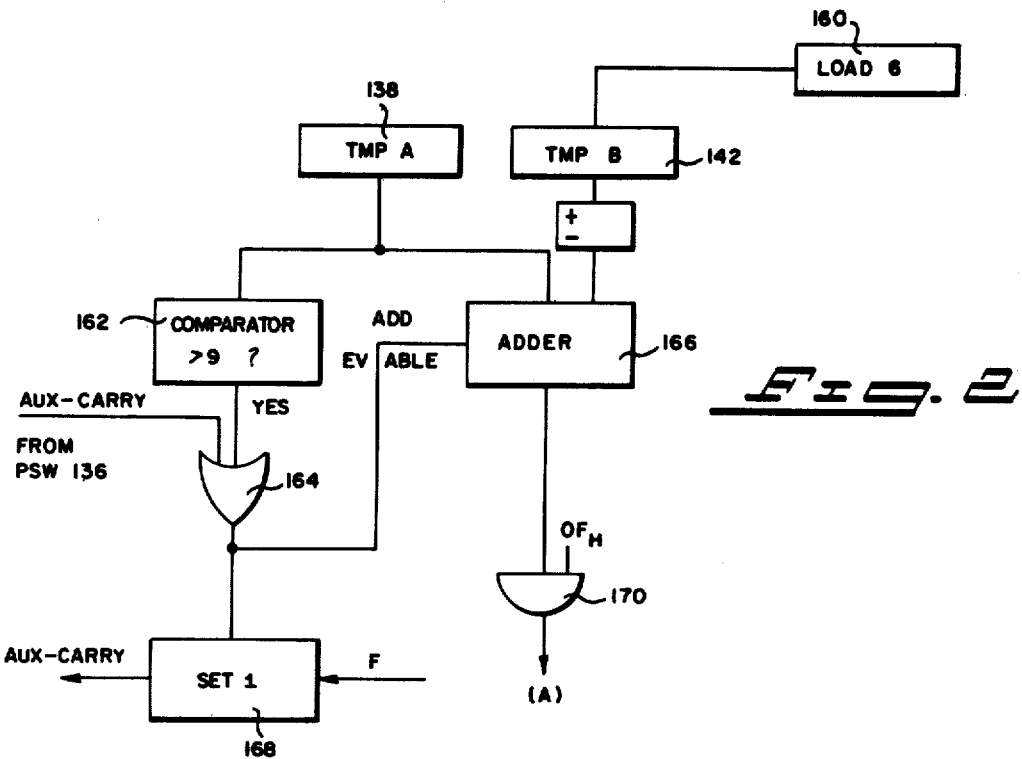
FIG. 2 is an equivalent logical circuit to dedicated ALU circuitry used in ASCII instructions.
Figure 3:
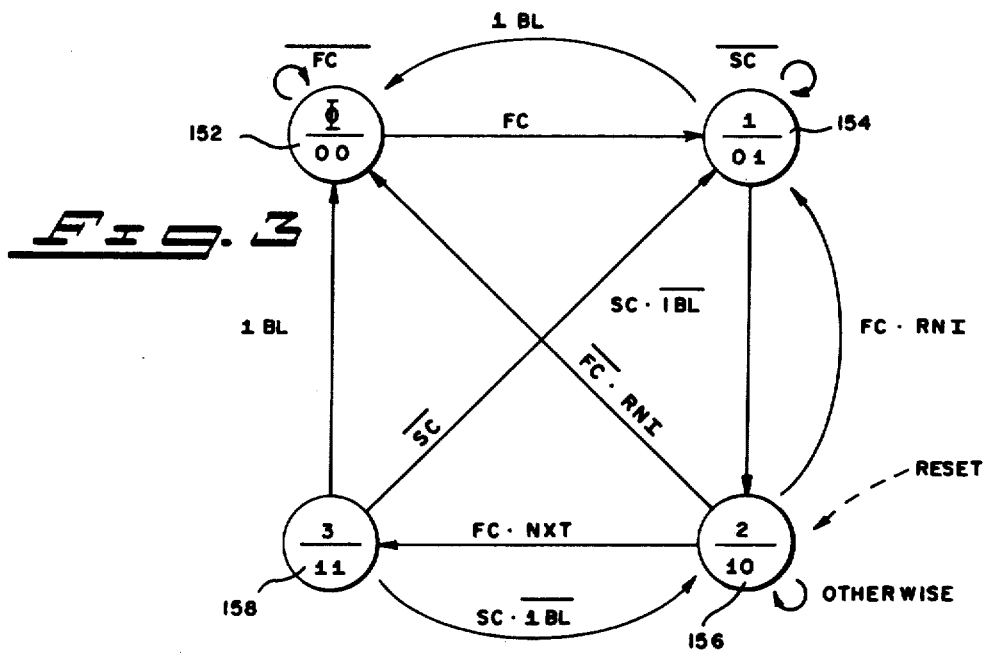
FIG. 3 is a symbolic state diagram for the lower control unit loader circuit.

FIGS. 1A and 1B are simplified diagrammatic block diagrams of a central processor 10 organized according to the present invention. Central processing unit or CPU 10 is characterized by the division of CPU 10 into a upper control means 12 diagrammatically shown in FIG. 1A and a lower control means 14, diagrammatically shown in FIG. 1B. As shown in FIGS. 1A and 1B upper unit or means 12 is coupled to lower unit or means 14 primarily by an ALU bus 16, an S or source bus 18, a D or destinction bus 20, and a Q bus 22. It must be also understood that there are a plurality of discrete command lines or buses connecting upper unit 12 and lower unit 14 in a manner which shall be described below.

Upper control unit 12 is the only portion of CPU 10 which is directly involved in the exchange of information with an external memory unit. As is well known to the art, all CPU's are used in combination with one or more memory systems, which in the present illustration shall be assumed to be a one megabyte semiconductor memory. Other types of memories or input/output devices well known to the art may be coupled, directly or indirectly, to the external address and data bus coupled to the address and data bus, input/output pins 24, of CPU 10.

Sixteen of the address and data bus pins 24 are coupled to a latch and input/output buffer 26, well known to the art. Binary information is coupled to a C bus 28 through a simple cross-over circuit 30. The sixteen pins are organized into two bytes of eight bits each to form a single sixteen bit word. Circuit 30 selectively couples two bytes forming a sixteen bit word to C bus 28 either in a normal order or reverse order. The use and explanation of cross-over circuit 30 is described in greater detail below.

Upper control unit 12 has an upper register file 32 which includes four-16 relocation registers 34 through 40 also denoted as registers RC, RD, RS and RA respectively. Upper register file 32 also includes a 16 bit program counter 42 denoted as register PC; a 16 bit indirect register 44, also denoted as register IND; a 16 bit operand register 46 also denoted as register OPR. In addition, register file 42 includes an instruction queue buffer 48, which in the embodiment illustrated, is shown as six paired 8 bit registers also denoted as registers Q0 through Q5. Register file 32 is coupled through C bus 28 and B bus 50 to temporary registers 52 and 54 respectively. C bus 28 is coupled to temporary register 52 through a multiplexer 56 which also has as its inputs the outputs of a constant read only memory or ROM 58. The outputs of temporary registers 52 and 54 are coupled to an adder 60 which in turn has its output coupled to a temporary register 62. The output of temporary register 62 is similarly coupled to C bus 28 to permit communication with the external address and data bus. Four lines of C bus 28 are singled out to form the first 4 bits of the 20 bit address. One line is coupled to the zeroeth order address pin 66 or A0, while the remaining three lines are coupled through a temporary register 64 to an address latch and buffer 68 having as its output, the three address bits A1 through A3.

Upper register file 32 is also coupled to ALU bus 16, S bus 18, D bus 20 and Q bus 22 to communicate with lower control unit 14 in a manner described below.

Finally, the upper control unit 12 also includes a T-state generator 70, a cycle decision logic circuit 72 and a Q control circuit 74. Each of these circuits are described below and are publicly marketed in a product under the trademark, Intel 8086. Upper control unit 12 also includes an external interface circuit 76 which is described in greater detail in a co-pending application assigned to the same assignee as the present invention filed on June 30, 1978 and entitled "APPARATUS AND METHOD FOR COOPERATIVE AND CONCURRED COPROCESSING OF DIGITAL INFORMATION", Ser. No. 921,082.

Cycle decision logic circuit 72 provides the proper commands to relocation registers 32 through 40 to execute the memory READ and WRITE cycles with proper timing. Relocation registers 32 through 40 are accessed through discrete control lines not shown in FIG. 1A in addition to being treated as ordinary digital information registers subject to the manipulation and control by the instructions. Queue control circuit 74 maintains a count of bytes in the instruction queue and their ordering. This information is provided to logic circuit 72 to effect the proper computations with respect to program counter 42, operand register 46 and indirect register 44 in the memory READ and WRITE operations described below, interrupt operations and their subsequent address and program counter corrections. Constant read only memory 58 selectively provides a series of integer values, such as +6 to −6, to adder 60 to be used during the relocation address corrections and program counter corrections discussed below. T-state timer circuitry 70 provides a plurality of flip-flop defined T-states to cycle upper control unit 12 through the instruction FETCH, READ and WRITE cycles and such other cycles, such as INTERRUPT cycles, which are typically required of a general purpose microprocessor. Queue control circuitry 74, cycle decision logic circuitry and T-state timing generator 70 employ random logic organized according to principles well known to the art to effect the functions described above.

Lower control unit 14 similarly has a lower or main register file 78 coupled to ALU bus 16 through a crossover circuit 80 similar to that of cross-over circuit 30. Main register file 78 is also appropriately coupled to S bus 18 and D bus 20. Main register file 78, in the illustrated embodiment, includes eight paired, 8 bit registers 82 through 96 also denoted as X, B, D, H, A, C, E, and L, respectively. Similarly, main file 78 includes a 16 bit stack pointer register 98 also denoted as register SP, a 16 bit memory pointer register 100 or register MP and two 16 bit index registers 103 and 105 or registers IJ and IK respectively.

Q bus 22 from upper control unit 12 is coupled to a plurality of registers and decoders in lower control unit 14. All eight bit lines of Q bus 22 are coupled to an instruction decoder 102 denoted as register IR. Similarly, the three least significant bits are coupled to an M register 104 whose output in turn is coupled to S bus 18 and D bus 20. Bits 3 through 5, the fourth through sixth most significant bits, are coupled to an N register 106 which also has its output coupled to S bus 18 and D bus 20. Bits 3 through 5 are also loaded into an X register 108 which has an output coupled to an ALU opcode register 110. Finally, all 8 bits of Q bus 22 are coupled to a main array register or AR register 112. The output of AR register 112 is coupled to the first stage decoder of main ROM array 114 which contains most or all of the microcode program. Similarly, the output of instruction register 102 is coupled to a group decode ROM 116. The microcode output from stage two of ROM 114 is coupled through a 4 to 1 multiplexer and latch 118. Five bits of the output of the latch is coupled to a 2 to 1 multiplexer 120, the output of which is similarly coupled to the input of a translation ROM 122. AR register 112 is paired with a counting and incrementing register or CR register 124. The output of translation ROM 122 is coupled to AR register 112 and CR register 124 which are similarly coupled in a bidirectional manner with a corresponding subroutine or SR register 126 and subroutine incrementing register 128 respectively. The operation of group decode ROM 116, translation ROM 122 and main ROM 114 are coordinated by a loader circuit 130 by discrete command lines not shown. The detailed operation of lower control unit 14 will be described below.

The output of multiplexer and latch 118 is similarly coupled to S bus 18 and D bus 20 and to ALU opcode register 110. The contents of opcode register 110 are translated by an ALU ROM 132 which provides the ALU control signals to a full function, 16 bit ALU circuit 134 which provides the arithmetic and logical operations for CPU 10. ALU 134 has its output coupled to ALU bus 16 and is coupled with the program status word or PSW register 136 which is used to test and manipulate the state of the plurality of flags. PSW 136 includes such conventional flag bits as carry, aux-carry, zero, sign, parity, overflow, direction, interrupt-enable and trap. The input to ALU 134 is provided by means of three temporary registers 138 through 142. The input to each of the registers 138 through 142 is derived from ALU bus 16. Both lower register file 78 and the temporary registers 138–142 are coupled to S bus 18 and S bus 20 by which these registers are selectively accessed.

Lower control unit 14 also contains certain random logic which facilitates operation and coordination of over-all functions of CPU 10. For example, the output of latch multiplexer 118 is coupled to a ROM-OUT control circuit 144 which has at least part of its outputs coupled to a prefix control circuit 146.

ROM-OUT circuitry 144 includes conventional random logic circuitry which generates an internal command signal, RUN-NEXT-INSTRUCTION, RNI, described in greater detail below. In addition, ROM-OUT control generates the next-to-last clock instruction, NXT, also described below. The communication between lower control unit 14 and upper control unit 12 is principally through the output bus connecting ROM-OUT control 144 to decision logic circuit 72. The communication between the upper and lower unit generally pertains: to memory reading and writing; to relocation register computations and manipulations; to correction operations with respect to the relocation of registers and program counter; to interrupt acknowledge operations; to input and output operations; and to clearing of queue 48 and suspension of overall microprocessor operation during a HALT mode. A large part of ROM-OUT control circuit 144 is coupled to program condition jump circuit 145 which provides the random logic needed to test conditions set-up in microcode jumps, some examples of which are given in the following tables.

A prefix control circuit 146 provides the required random logic for various prefix bytes in a conventional manner. In addition, prefix control circuit 146 provide the random logic for a base prefix instruction employed in the present invention. The circuit comprises three flip-flops denoted BPE, BPL and BPH. The first flip-flop, BPE, will be enabled in response to a discrete command generated by group decode ROM 116 in response to the loading of a BASE prefix into instruction register 102. The BASE prefix will indicate that a selected relocation register is to be used as a stack relocation register and data relocation register for the duration of the following instruction instead of the normally assumed registers when a stack address is made through MP, i.e., other than a push or pop instruction. The relocation register which is to be selected when the BASE prefix is used is determined by the state of the flip-flops BPL and BPH. Flip-flops BPL and BPH comprise a two bit field which is drawn from a relocation register instruction which will load, store, push or pop the contents of a specified relocation register. The BASE prefix allows the actual relocation register, which is normally assumed by program convention for use by an instruction accessing a relocation register, to be changed to that designated in the BASE prefix byte. Flip-flop BPL and BPH in prefix control circuitry 146 are coupled directly to the bit field corresponding to the relocation register designated within the BASE prefix and will be loaded when BPE has been enabled. On the next following instruction, BPE will be disenabled together with BPL and BPH and will remain disenabled until flip-flop BPE is again enabled by the occurrence of a base prefix byte.

Suitable interrupt control circuitry 148 may also be provided to service interrupt requests and to check the state of instruction execution to determine when CPU 10 could acknowledge an interrupt request. Interrupt control circuitry 148 is described in greater detail in the co-pending application entitled "APPARATUS AND METHOD FOR COOPERATIVE AND CONCURRED COPROCESSING OF DIGITAL INFORMATION", filed June 30, 1978, Ser. No. 921,082 assigned to same assignee of the present invention. This circuitry, as well as other circuitry described below, comprise the main functional blocks of lower control unit 14 whose internal operation and cooperation with upper control unit 12 may now be described and understood.

The present invention employs a six byte, first-in-first-out queue 48. CPU 10 is a two-level fetch ahead system. Inasmuch as there is no advantage in upper control unit 12 of fetching bytes faster than lower control unit 14 can execute them, and inasmuch as there is no advantage in lower control unit 14 executing faster than upper control unit 12 can fetch them, the queue is only so large as to allow enough bytes to be stockpiled so that the queue will be able to fetch enough bytes during the slow instructions to allow the fast instructions to run at full speed. The only other requirement is that at least two bytes of the queue must be empty before a new instruction is fetched inasmuch as two byte instructions are permitted. When these factors are considered, together with the execution time for the instruction set, the optimum queue length is six. It is to be understood that other queue lengths may be optimal depending upon the nature of the instruction set, and the execution speeds of the CPU according to the principles disclosed herein.

Upper control unit 12 and the lower control unit 14 are essentially unsynchronized in their operation with one another, although they both run from clock 150. The function of upper unit 12 is to run all external cycles, to maintain a program counter, PC 42 and relocation registers 34–40 at the proper relocation offset for all addresses, and to maintain the six byte instruction stream look ahead queue 48. Lower control unit 14 executes all instructions, reset and interrupt sequences, provides data and basic 16 bit addresses to upper control unit 12, and maintains main register file 78 and PSW 136. Interface to the outside world is also exclusively the domain of upper control unit 12 with the exception of certain interrupt functions handled directly in lower control unit 14.

The microprocessor of the present invention, although an ambidextrous 8 or 16 bit machine, operates in an extended memory space, which in the presently illustrated embodiment is accessed through a 20 bit address. Adder 60, which is a dedicated adder, performs the function of adding the relocation number to the base address and incrementing or decrementing the addresses if required by offset 16 bit accesses. Adder 60 is also used to provide a post-fetch correction to any given address and to apply corrections to PC 42 described in greater detail below.

PC 42 is not a real or true program counter in that it does not, nor does any other register within CPU 10, maintain the actual execution point at any time. PC 42 actually points to the next byte to be input into queue 48. The real program counter is calculated by instruction whenever a relative jump or call is required by subtracting the number of accessed instructions still remaining unused in queue 48 from PC 42. However, it is to be understood that in other embodiments a true program counter could be included within the CPU organization if desired.

The memory space used in combination with the present invention organizes digital information into 8 bit bytes. Any two consecutive bytes can be paired-up to form a 16 bit word without the necessity that the bytes be stored on even address boundaries. The convention used in the present invention is that the most significant 8 bits of the word are stored in the byte having the higher numerical memory address.

Relocation registers 34–40 are used to obtain an address in an extended memory space as follows. Four low order bits are appended to the 16 bits of any one of the relocation registers thereby providing the 20 bit base address of a page. RC register 34 serves as code relocation register; RD location register 36 serves as a data relocation register; RS relocation register 38 serves as a stack relocation register; and RA relocation register 40 serves as an alternate relocation register accessible with the base prefix instruction as described and by block move instructions. A 20 bit memory address corresponding to a 16 bit data stack or code address is obtained by adding a 16 bit base address to the appropriate relocation register. For example, the memory code address is obtained from adding the 16 bits of the program counter, PC 42, with RC register 34. In general, address lines A0–A3 are therefore directly tapped from register file 32 via C bus 28 and the least significant 4 bits of the selected register whose contents is added to the contents of the relocation register, are directly coupled to the address/data pins A0–A3. The next 12 bits from the selected register are then added to the 16 bits of the chosen relocation register in adder 60 and coupled through crossover circuit 30 to latch and input buffer 26. Consequently, the memory space is divided into pages of 16 words each, each word having a 16 bit length. Data is then accessed from the memory and placed upon C bus 28 to the appropriate register of upper file 32, namely one of the Q registers 48.

According to a command signal generated by loader circuit 130, described in greater detail below, one of the bytes from queue 48 will be accessed and coupled to Q bus 22 while Q control circuitry 74 maintains the proper fetch rate and control of upper control circuit 12 functions. The three least significant bits of the fetched byte will be inserted into M register 104 whose basic function is to hold the source bus code of the main operand of the instruction. Register 104 translates the register field of the first byte into the proper S and D bus code. Similarly, bits 3 through 5 are loaded into N register 106 whose basic function is to hold the destination bus code of the second operand of the instruction. X register 108 loads bits 3–6 of the byte and assumes that the opcode of the instruction is an ALU opcode. The entire byte is loaded into AR register 112. Since some of the instructions do not contain ALU opcodes, and since some instructions are two byte instructions, the assumptions made with respect to the significance of information loaded into registers 104, 106, 108 and 112 are sometimes incorrect. Any incorrect assumption is later corrected after the byte, which was loaded into instruction register 102, is properly decoded by group decode ROM 116. The correction scheme and procedure will be described in greater detail below.

Microcode control of the present invention consists principally of a main PLA or ROM 114 supported by two others, namely transition ROM 122 used to decode full length microcode jump addresses and a group decode ROM 116 to decode machine language opcodes for purposes of higher level organization. Nevertheless, many control functions are not handled through the ROMS but by random logic such as the prefix instructions described below, one clock non-ALU instructions, opcode decoding, direction bit, the 1 bit, various idiosyncrasies in flag handling, and certain differences between 8 or 16 bit data operations.

The opcode inserted into register AR is translated into a ROM starting address by treating the first stage of ROM 14 as a PLA by using the opcode itself directly as the ROM address for that instruction's microcode sequence. Each opcode is provided with a space in ROM 114 for the microcode sequence associated with that opcode. The opcode address itself cannot be incremented because of the danger of overflowing into the instruction opcode space of an adjoining opcode. Thus, a four bit incrementing register 124 is added and initially zeroed when the opcode is loaded into register AR 112. A ninth bit is added to register 112 to provide more programming space. The extra bit, ARX, is also initially reset. CR register 124 is then incremented across the 16 separate microcode states allowed each instruction while AR remains fixed and can only be changed by a long jump or return. A microcode subroutine is provided by register 126 used in combination with ROM 122 which encodes a 13 bit long jump address from a 5 bit microcode tag applied by ROM 114 through multiplexer 120.

The ROM microcode program does not control its own cycling. When the microcode routine for an instruction has been executed, ROM 114 passes lower unit control 14 back to the master timing circuit, loader 130, whose function is to load the next instruction from Q bus 22 into the appropriate lower unit control registers. When all new opcode and field information is loaded into lower control unit 14 and the ROM starting address for ROM 114 is properly initialized, loader 130 enables ROM 114 and passes control of lower control unit 14 to it.

The lower unit control thus alternates between a master four-state counter, loader circuit 130, and main microcode ROM 114. The function of the loader is to move instruction bytes containing opcode and register fields from instruction queue 48, across Q bus 22 and into the appropriate lower unit registers IR 104, M 104, N 106, X 108 and AR 112. Once ROM 114 is properly initialized, loader 130 permits ROM 114 to run by raising a ROM enable signal, ROME, to a binary 1. Main microcode ROM 114 does not have legitimate "off" states. Execution is stopped by resetting ROME to zero which will gate-off the key ROM outputs. The incrementing register CR 124 will continue counting regardless of the state of ROME. If ROM 114 is running, it must sense the end of an instruction execution sequence and send a discrete command signal, run the next instruction, RNI, to loader 130 to indicate that the current sequence of microcode instructions is over and that a new instruction is to be loaded.

An instruction decode overlap is maintained by another discrete control signal next, NXT. If ROM 114 can identify the unique next-to-last clock of the microcode sequence, it will send signal NXT to loader 130. If such is effected, the loading of the new instruction will overlap the execution of the last, thereby increasing throughput. Under these conditions loader 130 and ROM 114 will operate simultaneously without any break of ROM operation. The first execution clock of the new instruction will be directly followed by the last execution clock of the prior instruction.

Loader 130 generates two key timing signals for every sequence in lower control unit 14. These signals are a first clock, FC, indicating the first step of a load procedure and a second clock, SC, following FC at the next or some later clock indicating the second step of the load procedure. The first byte of an opcode is clocked across Q bus 22 at FC. The second byte, if any, will move across at SC. The significance of SC is greater than merely the loading of the second byte because it is only under and after the timing signal SC, that the output of group decoder ROM 116 is valid for the instruction being loaded. Thus, timing signal SC occurs regardless of how many bytes actually move across Q bus 22. The state diagram of loader 130 is diagrammatically illustrated in FIG. 2 and is simplified and depicted logically in the following equations:

$$FC = [(00) + (10) (NXT + RNI)] \cdot MT \text{ and,}$$

$$SC = [(01) + (11)][2BR \cdot MT].$$

2 BR is a decoded command signal generated by group decode ROM 116 indicating that the instruction at hand has at least two bytes and requires use of ROM 114 for decoding. MT is a signal generated by Q control circuitry 74 indicating that queue 48 is empty and that more bytes need to be fetched.

Referring now to FIG. 2, it should be noted that the operation of loader 130 is based upon two flip-flops in a manner well known to the art. In the zero state 152, the flip-flops are set at (00), the lower control unit 14 is not executing, and the first byte of the new instruction has not been located. The timing signal, FC, occurs on the transition out of zero state 152. In first order state 154, defined by (01) on the loader flip-flops, no instruction is being executed, the timing signal FC has occurred for the new instruction and the timing signal SC has not occurred. SC is generated on transition out of first state 154. If the internal command signal one byte logic, 1 BL, is generated from group decode ROM 116, loader 130 returns to zero state 152. The command signal 1BL indicates that the current instruction is recognized as a one byte logic instruction, in other words a one byte instruction which is not decoded by the use of ROM 114 but by random logic. However, upon generation of the timing signal SC and the nonoccurrence of 1BL, loader 130 will move to second state 156 defined by the flip-flop condition (10). The second condition is the run or.execution state wherein the timing signals SC and FC have occurred and loader 130 is waiting for the command signals NXT or RNI from ROM 114 to indicate that a new instruction is to be run or the next to the last clock pulse has been executed of the microcode sequence.

As indicated in the above logic equation, when in the second state if either the internal command signals in NXT or RNI are generated by ROM 114, loader 130 will either return to the first state in the case of the validity of RNI or to a third state in the case of receipt of NXT. Third state 158, defined by flip-flop configuration (11), is a mirror image of the first state with the exception that the prior instruction is still executing. If the timing signal FC is no longer active and ROM 114 indicates a new instruction is to be run, loader 130 returns to the zeroeth state to begin the fetch anew. While in the third state if the instruction is not a one byte logic type instruction and the timing signal SC is still valid, that is the instruction is a two byte ROM type instruction or queue 48 is not empty, loader 130 returns to the second state. If the timing signal SC has gone inactive, loader 130 returns to the first state configuration, otherwise if the next instruction is a one byte logic, loader 130 will be forced to the zeroeth state to turn and maintain ROM 116 off. The timing signals FC and SC are also used throughout the various registers within lower control unit 14 to set the time at which the register operates in its intended function according to well known principles.

Execution is enhanced in CPU 10 of the present invention by eliminating much of the instruction overhead as possible. In other words, the opcodes are assigned so that almost in all cases only the first byte of a multiple byte instruction is required to form the entire microcode address. The timing signal FC represents the only clock pulse in which the first byte is read by lower control unit 14. Since instruction register 102 still has its prior value, there is no current information as to the nature of the new instruction. Therefore, all lower control unit registers attached to Q bus 22 make a probablistic guess as to the nature of the new instruction and load from the first byte on the timing signal, FC accordingly. More particularly, instruction register IR 102 loads the first byte normally. M register 104 assumes the instruction could be a one byte instruction and thus it forms up the 16 bit register source bus code by taking the three least significant bits of byte one as a register field. N register 106 assumes that the instruction is a relocation register instruction by forming up a 16 bit relocation register destination bus code from bits 3 and 4 of the first byte as a relocation register field. X register 108 assumes the first byte may have ALU opcodes in bits 3 through 6 and loads these bits accordingly. AR register 112 and CR register 124 assume that byte one is a sufficient starting address and loads byte one into register AR 112, resets CR register 124 and starts accessing the microcode location in ROM 114. If any first guess was incorrect, it is corrected at the timing signal SC since at that time the output of group decode ROM 116 is then available as discrete command signals coupled to selected decoders and the above registers to cause the bit field to be redecoded under a different interpretation if necessary.

CPU 10 of the present invention has nine distinct addressing modes. The location of an operand in an instruction employed by the present invention is specified by various fields in the instruction. In particular, these fields include a register field or a combination of a mode field and an R/M field. The register field is a three bit field which specifies one of the 8 or 16 bit registers described above to be the location of the operand, and, hence the first two addressing modes. The register/memory field or R/M field is a three bit field in the instruction which specifies an 8 or 16 bit register or registers which are contained or used to locate the operand. The three bits designate eight ways in which certain registers can be employed for operand accessing in possible combination with two displacement bytes in the instruction. The mode field is a two bit field in the instruction which specifies whether the operand is contained in the indicated register or at a memory location pointed at by the register contents, and indicates the manipulation to be made on the displacement bits, if any. In particular, a register which is indicated can be either the location of the operand or can point to the location of the operand in memory. A W or word field is a one bit field in the instruction used in combination with one of the mode field codes to specify whether the operand is a byte or word quantity. Any of the registers and combinations of the 8 bit registers in upper file 78 may be the location, and certain ones may point to the location in memory of the operand specified in the instruction. An automatic address subroutine is initialized by loader circuit 130 at clock SC when required, that is whenever the instruction is a two bit ROM instruction and obtains the operand from a location in memory. The steps followed by the address subroutine are substantially similar to a normal long jump wherein the microcode address is saved except that movement of data into and out of AR register 112, CR register 124 and SR register 126 are under the control of loader circuit 130 rather than ROM 114. The mode and register/memory fields are directly loaded into translation ROM 122 through multiplexer 120 from Q bus 22 to obtain one of the nine starting subroutine microcode addresses by a direct decode. As a result the addressed operand is automatically loaded into the appropriate upper file registers, usually OPR register 46 in the same manner as a normal instruction fetch as described above.

The operation and organization of the present invention can be better understood by considering in detail the execution of a number of specific instructions which are particularly unique to the CPU utilizing the present invention.

CPU 10 may execute what is defined as string instructions consisting of a set of primitive one byte instructions which can be performed either once or repeatedly.

When used as a repeated operation the string instructions permit a complete string or loop operation to be hardware executed as opposed to typical software execution. When used in the form of a single operation, the string instructions permit the writing of a tight software loop which could be used to perform more complex string instructions. All primitive string instructions use BC registers 84 and 92 respectively as a loop counter and IJ register 103 and if necessary IK register 105 as pointers to operands in memory. If a direction flag in PSW 136 has been cleared, the operand pointers are incremented after being used, otherwise they are decremented automatically by ALU 134. Other software instructions are provided in the instruction set for setting or clearing the direction flag in PSW 136.

The primitive string instructions are MOVE, COMPARE, SEARCH, LOAD, and STORE. The MOVE primitive moves a string of characters, i.e. 8 bit bytes, from one block of memory to another. The COMPARE primitive permits comparing two character strings to determine after which character the strings become unequal and thus help to establish a lexigraphical ordering between the strings. The SEARCH primitive permits searching for a given character in a character string. The STORE primitive is used for filling in a string of characters with a given value. Typically, the STORE primitive and the LOAD primitive are used as building block instructions to form tight software loops that perform complex string instructions. Each of the primitive instructions also has the ability to operate on words as well as characters or bytes. Included among the string instructions is a prefix, REPEAT, which provides for rapid loop control in a hardware repeated string operation. Any of the primitive instructions can be preceded with the one byte prefix, REPEAT, which will repeat the instruction as long as the loop count is not zero. The test for the loop count is made prior rather than after each repetition of the loop so that the initial loop count of zero will not cause any executions of the primitive string instruction. During each repetition of the loop, the loop counter is decremented. During the repetition of any string instruction the PC program counter 42 remains pointing at the repeat prefix byte and is not updated until after the last repetition of the string instruction. This fact, together with the continuous updating of the operand pointers and count register, allow that the repeated instruction to be correctly resumed if it is interrupted. External interrupt will be permitted prior to each repetition of the primitive string instruction.

A loop instruction provides the same control as the REPEAT prefix but in tight software loops to perform complex string operations. A loop instruction decrements the loop count in register BC and performs a relative branch, typically to the start of the loop, if either the count has not become zero or the zero flag of PSW 136 is not at a specified setting. A form of loop instruction is also available that does not test the zero flag. The loop instruction is typically placed at the end of the loop and tests for loop repetitions after each execution of the loop. This means that if the loop counts were initially zero, the loop will still be executed. A SKIP instruction is introduced to prevent undesirable repetitions. A SKIP instruction performs a relative branch if register BC contains a zero and does so without altering the contents of BC. Translate, XLAT, is another primitive string instruction used as a building block in tight loops. The XLAT instruction allows a byte fetch from one string to be translated before being stored into a second string or compared to a given byte. Translation is performed by using the value in the A register 90 to index into a table pointed at by HL register 88 and 96. The translated value obtained from the table then replaces the value initially held in a register 90.

The machine language code for the string instructions are set forth below in summary form.

TABLE 1
STRING INSTRUCTIONS

STRING LOAD

```
7 6 5 4 3 2 1 0
1 0 1 0 1 1 0 w
```

Mnemonic:
LDS (w=0)
LDSW (w=1)
Description:
if w=0 then ((IJ)) → (A)
else ((IJ))+1,(IJ)) → (XA)
if (DIRECTION)=1 then (IJ)−(1+w) → (IJ)
else (IJ) + (1+w) → (IJ)
Flags Affected:
None

STRING STORE

```
7 6 5 4 3 2 1 0
1 0 1 0 1 0 1 w
```

Mnemonic:
STS (w=0)
STSW (w=1)
Description:
if w=0 then (A) → ((IK))
else (XA) → ((IK))+1,(IK))
if (DIRECTION)=1 then (IK)−(1+w) → (IK)
else (IK) + (1+w) → (IK)
Flags Affected:
None

STRING COMPARE

```
7 6 5 4 3 2 1 0
1 0 1 0 0 1 1 w
```

Mnemonic:
CMPS (w=0)
CMPSW (w=1)
Description:
if w=0 then ((IJ))−((IK))
→ nowhere but flags are set
else ((IJ)+1,(IJ))−((IK)+1,(IK))
→ nowhere but flags set
if (DIRECTION)=1 then
(IJ)−(1+w) → (IJ)
(IK)−(1+w) → (IK)
else
(IJ)+(1+w) → (IJ)
(IK)+(1+w) → (IK)
Flags Affected:
CARRY, AUX-CARRY, SIGN, ZERO, PARITY, OVERFLOW

STRING SEARCH

```
7 6 5 4 3 2 1 0
1 0 1 0 1 1 1 w
```

Mnemonic:
SRCHS (w=0)
SRCHSW (w=1)
Description:
if w=0 then (A)−((IK))
→ nowhere but flags are set
else (XA)−((IK)+1,(IK))
→ nowhere but flags are set
if (DIRECTION)=1 then (IK)−(1+w) → (IK)

TABLE 1-continued
STRING INSTRUCTIONS else (IK)+(1+w) → (IK)
Flags Affected:
CARRY, AUX-CARRY, SIGN, ZERO, PARITY, OVERFLOW
STRING MOVE

```
7 6 5 4 3 2 1 0
1 0 1 0 0 1 0 w
```

Mnemonic:
MOVS (w=0)
MOVSW (w=1)
Description:
if w=0 then ((IJ)) → ((IK))
else ((IJ)+1,(IJ)) → ((IK)+1,(IK))
if (DIRECTION)=1 then
(IJ)−(1+w) → (IJ)
(IK)−(1+w) → (IK)
else
(IJ)+(1+w) → (IJ)
(IK)+(1+w) → (IK)
Flags Affected:
None
REPEAT PREFIX
Repeat:

```
7 6 5 4 3 2 1 0
1 1 1 1 0 0 1 z
```

Description:
while (BC) < > 0
service pending interrupt (if any) here
perform primitive string instruction
in succeeding byte
(BC)−1 → (BC)
if primitive instruction is one specified to
to affect ZERO flag
and (ZERO) < > z
then exit 'while' loop
end-of-while
(PC)+2 → (PC)
LOOP

```
7 6 5 4 3 2 1 0      7 6 5 4 3 2 1 0
1 1 1 0 0 0 1 0         displacement
```

Mnemonic:
LP
Description:
(BC)−1 → (BC)
if (BC)< > 0 then
(PC) + displacement → (PC)
where "displacement " is an 8-bit signed number
Flags Affected:
None
SKIP

```
7 6 5 4 3 2 1 0      7 6 5 4 3 2 1 0
1 1 1 0 0 0 1 1         displacement
```

Mnemonic:
SKP disp
Description:
if (BC)=0 then (PC) + displacement → (PC)
where "displacement" is an 8-bit signed number
Flags Affected:
None
TIGHT LOOP INSTRUCTIONS
Translate:

```
7 6 5 4 3 2 1 0
1 1 0 1 0 1 1 1
```

Mnemonic:
XLAT
Description:

TABLE 1-continued
STRING INSTRUCTIONS ((HL)+(A)) → (A)
Flags Affected:
None
LOOP AND TEST ZERO

```
7 6 5 4 3 2 1 0      7 6 5 4 3 2 1 0
1 1 1 0 0 0 0 z         displacement
```

Mnemonic:
LPW disp for z=1 (means LooP While)
LPU disp for z=0 (means LooP Until)
Description:
(BC)−1 → (BC)
if (ZERO) = z and (BC)< > 0 then
(PC) + displacement → (PC)
where "displacement is an 8-bit signed number
Flags Affected:
None As can be seen the general form the primitive string instruction consists of one byte having a 7 bit opcode and a w bit which is used to signify whether the string instruction is to operate on a character or a byte (w=0) or on a word (w=1).

Consider the following example as a use of string instructions to write a tight software loop. The task is to scan over a string of input characters until a character is encountered that is not alphanumeric. IJ register 103 is initialized to point to the beginning of the input string and register BC is initialized to contain the length of the input string. The direction flag is cleared in PSW 136 and the HL register has been loaded with the first address of a translation table. The translation table contains one byte for every possible character. Every character which is an alphanumeric character has been assigned a unique arbitrary code. This same code is placed into E register 94. The software loop using a string instruction to scan for a first nonalphanumeric character is as follows:

```
    SKP X1
X2:
    LDS
    XLAT
    CMP A,E
    LPW X2
X1:
```

The routine above causes the following to occur. With the instruction SKP X1 the program will skip to X1 if the count register is zero by adding the displacement X1 indicated in the SKIP instruction to the program counter as can be verified by reference to TABLE 1 above. If the contents of the counter is nonzero, then the next byte is accessed, namely the string load instruction LDS. As verifiable from TABLE 1 the contents of the memory location pointed at by the contents of register IJ, in other words the first character in the input string of characters will be loaded into the A register or accumulator 90. The character loaded into the accumulator will be added to the first address of the translation table which is contained in register HL to form a memory address. That address will be the location in the translation table which corresponds to the character read from the input string of characters. The code into which the character is translated will then be retrieved from that location and put into accumulator 90. The COMPARE instruction, CMP A,E by definition will subtract the contents of register E from the contents of register A which was previously loaded with the alphanumeric translated code. If the first character of the string of characters is not an alphanumeric code the subtraction will result in a positive or negative nonzero number. However, if it is equal to an alphanumeric code the sum will be zero thereby affecting a zero flag bit in PSW 136. The loop and test zero instruction, LPW, will subtract one from the contents of the count register BC. If the zero flag is set and the BC register is still nonzero, then the displacement X2 contained in the loop in the test zero instruction will be added to the program counter and reinserted into the program counter. Inasmuch as the displacement can be a negative number the program counter can be backed up by the proper number of bytes to re-enter the program at the first step with the string load instruction, LDS. It will be noted that the string load, LDS, will increment IJ register 103 by one since it was assumed that W=0. As a result the next character from the string of input characters will be loaded into the accumulator for comparison.

Now consider the situation in which it is desired to search a string of characters to identify which one is the given one, such as would occur during an ordinary operation to look up and identify specific data in a search file. To accomplish this register IK is initialized to point to the beginning of the file of input characters to be searched, BC is initialized to contain the length of the input file and a reset flag is reset or cleared. The hardware loop would consist simply of the following:

```
    SKP X1
X2:
    RPT
    SRCHS
X1:
```

The SKIP instruction would skip the loop if the counter register BC is zero. If not, the repeat prefix, RPT, is read to indicate that as long as the BC register is not zero, the primitive string instruction which follows is to be performed and only when the zero flag and Z bit of the repeat instruction are equal is the loop to be exited at X1. When exited, the program counter is incremented by 2. In the example chosen, the primitive string instruction which follows the repeat prefix is the string SEARCH which, as is verified by TABLE 1, will take the contents of A register 90 into which the particular character which is being sought has been loaded and subtract it from the contents of the location pointed at by the contents of IK register 105. As long as these two characters are different, the difference will be nonzero and the zero flag uneffected. Thus, it can be appreciated that a "hardware loop" can be written by use of the repeat prefix. The string instructions may be used in "hardware" loops and tight software loops because the string primitives COMPARE, SEARCH, LOAD and STORE each contain an incrementing or decrementing function among the operations which are performed. The microcode structure of each the string instructions is described in greater detail below.

Decimal instructions are handled by CPU 10 both in packed BCD and unpacked BCD form. Packed BCD instructions deal with BCD information which is coded to contain two decimal digits per byte. Unpacked BCD digital information contains one decimal digit per byte. ASCII code is a special case of unpacked BCD. ASCII information is in byte form and coded in such a manner that the four most significant bits of the byte are only the parity bit and the code 011 to designate that the following information is a numerical character. The least significant four bits of the ASCII byte in such a case is the binary coded decimal digit. CPU 10 of the present invention is capable of executing arithmetic operations with respect to ASCII information with greater ease and facility than in the prior art.

The basis of the ASCII instructions revolves about an adjust cycle. Addition and subtraction adjustment according to an ASCII instruction used in the present invention is similar to the corresponding packed BCD adjustments except that the X register is updated if an adjustment on the accumulator, register A, is required. Consider the addition and subtraction adjustments as set forth in Table 2 below.

TABLE 2

ASCII Addition a + b → c
$0 \rightarrow$ (CARRY)
DO i = 1 to N
(a[i]) → (A)
(A) + (b[i]) → (A)
where "+" denotes add with carry
add−adjust(A) → (XA)
(A) → (c[i])

ASCII Subtraction a − b → c
$0 \rightarrow$ (CARRY)
DO i = 1 to N
(a[i]) → (A)
(A) − (b[i]) → (A)
where "−" denotes subtraction with borrow
subtract−adjust (A) → (XA)
(A) → (c[i])

ASCII (unpacked BCD) Adjust for Addition 7 6 5 4 3 2 1 0
| 0 0 1 1 0 1 1 1 |

Mnemonic:
AAA
Description:
if (A).low-nibble > 9 or (AUX-CARRY) = 1 then
(A) + 6 → (A)
(X) + 1 → (X)
1 → (AUX-CARRY)
(AUX-CARRY) → (CARRY)
(A) AND 0FH → (A)
Flags Affected:
CARRY, AUX-CARRY, SIGN, ZERO, PARITY based on (A)
OVERFLOW undefined ASCII (unpacked BCD) Adjust for Subtraction 7 6 5 4 3 2 1 0
| 0 0 1 1 1 1 1 1 |

Mnemonic:
AAS
Description:
if (A).low-nibble > 9 or (AUX-CARRY) = 1 then
(A) − 6 → (A)
(X) − 1 → (X)
1 → (AUX-CARRY)
(AUX-CARRY) → (CARRY
(A) AND 0FH → (A)
Flags Affected:
CARRY, AUX-CARRY, SIGN, ZERO, PARITY, based on (A),
OVERFLOW undefined A and B represent two multiple character ASCII numbers. N represents the number of ASCII characters in the longer of the two numbers. In the ASCII addition instruction the carry flag is first set to zero and then the loop is entered. Beginning with the first character of the ASCII numbers, the first character is loaded into A register or accumulator 90. The first character of the second sum is then added to the contents of accumulator 90 in an add-with-carry operation. Obviously the high order nibble, the most significant four bits, will be a meaningless sum since it will be the addition of the two ASCII codes and the parity bit for each character. An excess six code adjustment is made by testing the low nibble of accumulator 90 to determine whether or not the number there is greater than 9 or if the auxiliary carry flag in PSW 136, AUX-CARRY, has been set. If so then six is added to the contents of accumulator 90 and one is added to the contents of X register 82. The flag AUX-CARRY is then set and the carry flag is set to match AUX-CARRY. The contents of accumulator 90 is then logically combined with the hexidecimal number OF in an AND function in order to set the high order nibble to zero and to carry forward the low order nibble which contains the meaningful numerical information. The contents of accumulator 90 is then stored in the location corresponding to the sum for that character. The loop then repeats the operation with respect to the next higher order ASCII characters of the addends.

Similarly, ASCII subtraction is shown in Table 2. The subtract adjustment is done in an excess six code in the same manner as the adjust addition except that a six is subtracted from the contents of accumulator 90 and the contents of X register 82 is decremented by one. It will be noted that in neither the subtraction nor addition routine as shown in TABLE 2 does not contents of X register 82 figure in. However, the add adjustment will be used in the ASCII multiplication scheme as diagrammatically shown in TABLE 3.

The ASCII instructions of the present invention are particularly useful with respect to multiplication and division. Consider for example, the multiplication routine as shown in TABLE 3.

TABLE 3

ASCII Multiplication a * b → c
(b) AND OFH → (b)
0 → (c[1])
DO i = 1 to N
(a[i]) AND OFG → (A)
(A) * (b) → (XA)
multiply-adjust(A) → (XA)
(A) + (c[i]) → (A)
add-adjust (A) → (XA)
(A) → (c[i])
(X) → (c[i+1])
ASCII Division a/b → c
(b) AND OFH → (b)
0 → (X)
DO i = N to 1
(a[i]) AND OFH → (A)
(A) * (b) → (XA)
divide-adjust(XA) → (A)
(A) / (b) → (A)
with quotient going into (X)
(A) → (c[i])
ASCII (unpacked BCD) Adjust for Multiplication 7 6 5 4 3 2 1 0        7 6 5 4 3 2 1 0
|1 1 0 1 0 1 0 0|      |0 0 0 0 1 0 1 0|

Mnemonic:
AAM
Description:
(A) / 10 → (X)
(A) mod 10 → (A)
Flags Affected:
CARRY, AUX-CARRY, undefined, SIGN, ZERO, PARITY based on (A), OVERFLOW undefined
ASCII (unpacked BCD) Adjust for Division 7 6 5 4 3 2 1 0        7 6 5 4 3 2 1 0
|1 1 0 1 0 1 0 1|      |0 0 0 0 1 0 1 0|

Mnemonic:

TABLE 3-continued

AAD
Description:
(X)*10 + (A) → (A)
0 → (X)
Flags Affected:
CARRY, AUX-CARRY undefined, SIGN, ZERO, PARITY based on (A), OVERFLOW undefined The ASCII number b is combined in an AND function with the hexidecimal number OF to zero the most significant four bits. The contents of the c(1) location, the product, are set to zero. The loop is entered by zeroing the most significant four bits of the ASCII multiplicand and setting the result in accumulator 90. The routine which is set forth in TABLE 3 is a routine which multiplies a multiple character multiplicand by a single character multiplier. For multiple character multipliers the routine would be repeated to obtain a plurality of products which would then be combined in appropriate form according to the normal multiplication algorithm for decimal numbers.

The contents of accumulator 90 are then multiplied by the ASCII multiplier and the product loaded into the 16 bit XA register 82 and 90. The 16 bit binary product is then subjected to a multiply adjust ASCII instruction. A multiplication adjust, AAM, first divides the contents of accumulator 90 by 10 and places the results in X register 82. The contents of accumulator 90 are then reduced modulo 10 in order to place the remainder of the division into accumulator 90. The result is that the product of b with the number a(1) is presented in unpacked BCD form in 16 bit register XA. The contents of accumulator 90 are then added to the product c(1) which in the first transit through the do loop had been set at zero. The results of sum are loaded back into accumulator 90. A binary sum is now represented in accumulator 90 and is adjusted to BCD unpacked form by an addition adjustment, AAA, of the type previously described. The contents of accumulator 90 are then loaded into the c(1) location and the contents of X register 82 loaded into the c(2) location.

The do loop repeats by multiplying the second character a(2) by the multiplier and placing the product in 16 bit register XA. The multiply adjustment instruction converts the contents of accumulator 90 into an unpacked BCD form and loads register XA with the result. The accumulator 90 is then added to the contents of location c(2) which contains the carry from the previous multiplication. The result is loaded into accumulator 90. Since the binary sum may be in excess of nine, the add adjustment instruction previously described follows with the BCD result appearing in register XA. The incrementation of X register 82 automatically carries over any carry from the BCD adjustment. The results in X register 82 and accumulator 90 are loaded into the proper product locations. Thus, the contents of X register 82 which was immaterial to the ASCII addition routine becomes an integral part of the ASCII multiplication routine through the addition adjustment instruction.

The ASCII routine for division is similarly shown in TABLE 3 and consists of a do loop repeated from the highest order character to the lowest. The routine shows a single character divisor and a multiple character dividend. The routine shown in TABLE 3 can be appropriately used as a subroutine in a larger scheme to accommodate multiple character divisors according to principles well known to the art. The high order nibble of the ASCII coded divisor is first zeroed. X register 82 is similarly zeroed. Then the do loop is entered beginning with the highest ordered character. The highest order character of the dividend, a(N) has its four most significant bits similarly zeroed and loaded into accumulator 90. An ASCII instruction divide adjust, AAD, is then executed with respect to the contents of register XA.

The adjustment for division first takes the contents of X register 82 and multiplies it by 10 and adds the product to the contents of accumulator 90 and places the result into accumulator 90. In other words, the BCD unpacked coded number is converted into binary form and placed into accumulator 90. Zeros are again written into X register 82. The divisor is then divided into the contents of accumulator 90 with the quotient being placed in accumulator 90 and the remainder being placed in X register 82. The contents of accumulator 90, the quotient, is then loaded into the appropriate location for the highest order character of the quotient. The count is decremented and the next lower order ASCII character, is loaded into accumulator 90. The contents of register XA is again subject to a divide adjust as described above to place the binary equivalent into accumulator 90. The division is made with the result being loaded into appropriate quotient location and the remainder reinserted into X register 82 for the next lower order of character, if any.

It should be noted that in the multiplication and division routines the multiply adjust and divide adjust steps are in a different sequence with respect to the actual multiplication or division. The actual arithmetic operation is computed in binary form. Since the ASCII code is an unpacked BCD and zeroed for actual computation, the numbers are actually in binary form and the multiplication adjustment need only be made after the product is obtained. However, since the remainder of a division is put into X register 82 after each character division, a divide adjustment must be made in each instance before the actual division is executed. The microcode format for the ASCII adjust instructions is described in greater detail below.

The CPU of the present invention also employs an additional bit in the opcode in two classes of instructions. A d bit is included in the opcode in the class of two operand instructions and an l bit is included in the opcode in the class of immediate instructions. Consider, for example, the add instruction shown below in tabular form in TABLE 4.

TABLE 4

| INSTRUCTION SET DETAILS |
| --- |
| Add |
| 7 6 5 4 3 2 1 0    7 6 5 4 3 2 1 0 |
| 0 0 0 0 0 0 d w    mod reg r/m |
| Mnemonic: |
| ADD reg,ea (w=0) |
| ADDW reg,ea (w=1) |
| reverse ea and reg is d=1 |
| Description: |
| if w=0 then |
| if d=1 then (REG8) + (EA8) → (REG8) |
| else (EA8) + (REG8) → (EA8) |
| else |
| if d=1 then (REG16) + (EA16) → (REG16) |
| else (EA16) + (REG16) → (EA16) |

TABLE 4-continued

| INSTRUCTION SET DETAILS |
| --- |
| Flags Affected: |
| CARRY, AUX-CARRY, SIGN, ZERO, PARITY, OVERFLOW |

The six most significant bits of the opcode uniquely provide the addition instruction opcode address. Bit 1 of the opcode is the d bit and bit 0 of the opcode is the w bit which indicates whether an 8 or 16 bit operation is to follow. The d bit provides for software programming of the direction in which the operation is to proceed. In other words, as shown in TABLE 4 above, if the d bit has been set at 1 the contents of a first register and a second register or memory location are added and inserted into the first register. However, if the d bit is zero then the memory location or second register is added to the first register and the result placed in the second register or memory location. The facility by which CPU 10 processes the d bit is particularly advantageous. The d bit is not microcode decoded but is decoded using conventional random logic. Group decode ROM 116 generates an internal discrete command signal, DACT, which indicates that the current instruction loaded in the various registers has a d field. DACT is directly coupled to a cross-over circuit 172 shown in FIG. 1B. Normally, the output from M register 104 and N register 106 are treated as designating the source and destination in an assumed order. In other words, normally M register 104 generates the source code to select the appropriate source register while N register 106 selectively generates an enable signal and the destination code for the destination register. However, the d bit provides an additional coding capacity to reverse the assumed source and destination assignment by reversing the outputs of M register 104 and N register 106 by conventional means within a cross-over circuit 172 in response to DACT.

Now consider the use of the l bit in the opcode of an add immediate instruction as diagrammatically shown in TABLE 5 below.

TABLE 5

| Add Immediate | |
| --- | --- |
| 7 6 5 4 3 2 1 0 | 7 6 5 4 3 2 1 0 |
| 1 0 0 0 0 0 1 w | mod 0 0 0 r/m |
| 7 6 5 4 3 2 1 0 | |
| data | data if w,l = 1,0 |

Mnemonic:
ADDI ea,data (w=0)
ADDIW ea,data (w=1)
Description:
If ea = d8 or d16 then
data is the contents of the byte(s) following the d8 or d16 byte(s)
else
data is the contents of the byte(s) following the instruction
if w=0 then data is the contents of a byte
if w,l = 1,1 then
data is the contents of a byte sign extended to form a 16-bit quantity
if w,l = 1,0 then
data is the contents of a pair of consecutive bytes with the low-order byte preceding the high-order byte
if w=0 then (EA8) + data → (EA8)
else (EA16) + data → (EA16)

TABLE 5-continued

Flags Affected:
CARRY, AUX-CARRY, SIGN, ZERO, PARITY, OVERFLOW

The opcode of the add immediate instruction is similarly identified in the six most significant bits of the opcode, bit 1 is the l bit and bit 0 is the w bit as before. The add immediate instruction may consists of four bytes. The first byte pertains to the opcode, the second byte pertains to the register or memory location EA, and the last two bytes hold the immediate data.

Assume for simplicity that the quantities be added are single bytes, i.e. w=0. The data, in the instruction, is then the contents of a byte. The register or memory location (EA8) is then added to the data byte and the result placed in that memory location or register.

If, however, the information to be added is of word length, then the contents of the 16 bit memory or register location will be added to the immediate data in the instruction and placed back in that memory location or register (EA16). The l bit permits the use of both 8 and 16 bit data in a word length addition. If the l bit is set at 1 then the immediate data is the contents of the single byte in the instruction with the sign bit extended to form a 16 bit quantity. This is done in dedicated hardware in ALU 134 according to design principles well known to the art. However, if the l bit is set at a binary zero, then the data which is manipulated is the 16 bit quantity in the pair of consecutive bytes forming the last pair of a multiple byte instruction with the low order byte preceding the high order byte. The l bit then allows both 8 and 16 data words to be handled in an identical manner in data immediate instructions in a form which is hardware identical.

Finally, CPU 10 of the present invention is capable of operating in a mode utilizing a floating point hook to coordinate operation of the present invention with a separate chip, such as a match chip, which will perform floating point operations to thus allow hardware executed floating point operations rather than by use of software subroutines. The math chip has the ability to monitor the address/data bus and to be constantly aware of the current instruction being executed. In particular, the math chip is set to detect a special instruction, FLOAT, and will perform the necessary actions in response thereto. In order for the math chip to know the address of the instruction which it is to access, CPU 10 will react to a FLOAT instruction by performing a read operation without transferring the results of the read operation to lower control unit 14. The address read will be taken from the operand address specified in the FLOAT instruction thereby placing the address on the address/data bus for the math chip to see. While the math chip is executing its routines, CPU 10 may enter an idle state during which it must wait for the math chip to release the use of the address/data bus. An external test pin on CPU 10 is used to indicate to CPU 10 whether or not the math chip is ready to execute another instruction. Otherwise, the instruction, WAIT, will cause CPU 10 to idle. In the illustrated embodiment the specific form of FLOAT and WAIT is indicated below in TABLE 6.

TABLE 6

FLOATING POINT HOOK

```
7 6 5 4 3 2 1 0      7 6 5 4 3 2 1 0
1 1 1 1 1 xxx        mod  xxx    r/m
```

Mnemonic:
FLOAT ea
Description:
(EA16) → nowhere except address is sent out on bus
Flags Affected:
None

WAIT

```
7 6 5 4 3 2 1 0
1 0 0 1 1 0 1 1
```

Mnemonic:
WAIT
Description:
if no signal on "test pin" then reexecute this instruction
Flags Affected:
None The mircocode routines for the above instructions can now be understood.

Although the present embodiment is described with respect to a particular instruction set coding and microcoding in relation to operation of the above described hardware, it is to be expressly understood that all equivalent types of hardware components which relate one to the other in a logically equivalent manner, may be employed and included within the scope and spirit of the present invention by those having ordinary skill in the art. Consider for example the microcode routine for the ASCII add adjust instruction, AAA. TABLE 7 below summarizes the ASCII addition and subtraction adjustments.

TABLE 7

| AR | X | 7 | 6 | 5 | 4 | 3 | 2 | 1 | 0 | CR | S | D | Typ | a | b | F |
|---|---|---|---|---|---|---|---|---|---|---|---|---|---|---|---|---|
| AAA | 0 | 0 | 0 | 1 | 1 | X | 1 | 1 | 1 | 0 | A | tmpaL | 1 | XI | tmp2 | |
| AAS | | | | | | | | | | 1 | ONES | tmpb | | | | |
| | | | | | | | | | | 2 | Σ | A | 1 | DEC | tmpb | F |
| | | | | | | | | | | 3 | | | 0 | X∅ | 5 | |
| | | | | | | | | | | 4 | | | 1 | INC | tmpb | |
| | | | | | | | | | | 5 | X | tmpb | 0 | NCY | 7 | |
| | | | | | | | | | | 6 | Σ | X | 4 | none | RNI | |
| | | | | | | | | | | 7 | | | 4 | none | RNI | |

Each mircocode instruction consists of two halves which are allowed to operate in parallel. The first half, bits 1 through 10, contain the source and destination field allowing a general move between any two data sources on ALU but 16. The second operation, which occurs in parallel with the first, may be any one of the six following types of instruction contained in the microcode fields TYP, A, B and F:

a short-range jump;
an ALU conditioning command;
a general control bookkeeping pair;
a memory cycle request;

a long-range jump; and a long-range jump with SAVE, i.e. a call.

The ROM address as stored within AR register 112 is shown in bits 0 through 7 and the extra added bit ARX in TABLE 7. The contents of the incrementing register CR is shown in decimal form in a column to the right of the ROM address. The columns S, D, TYPE, A, B, and F represent in mnemonic form the 21 bit microcode which is stored in ROM 114 corresponding to the ASCII adjust and subtract. The source and destination fields occupy bits 1 through 10 and, according to a source and destination bus code assignment, uniquely identify one of the registers in upper or lower files 48, 78 or one of the ALU registers.

There are six types of microcode instructions in the present invention. Type 1 is an ALU conditioning instruction which sets up ALU 134, which is taken to include PSW 136, to perform a specified function. A type 0 microcode instruction is a short jump which provides for a conditional jump within the microcode burst or sequence. A type 4 instruction is a bookkeeping instruction. Other types include a type 6 memory cycle, type 5 jump cycle and type 6 long jump cycle with an address save.

In the case of the ASCII addition adjust and subtract adjust, as shown in TABLE 7, the microcode burst consists of 8 microcode instructions. The first microcode instruction, moves the contents of A to the lower 8 bits of the 16 bit temporary register TMP A 138. The second half of the microcode instruction is an ALU conditioning command which preconditions ALU 134 to add without carry the contents of TMP A 138 and TMP B 142. The opcode symbolically represented by XI consists of bits 13 through 17, which five bits are loaded in opcode register 110 and decoded through ROM 132 to ALU 134. The opcode will either be a unique ASCII adjustment for addition or subtraction to be performed upon the contents of the microcode b field, which field includes bits 18 through 20 in the case of an ALU instruction. Bit 21 is a flag bit which indicates whether or not the PSW flags are to be updated. The ALU is preconditioned to test the contents of temporary register A to determine whether or not they exceed 9 or whether the auxiliary carry flag is set. The precharged ALU bus 16 is set at the beginning of each clock cycle to a full complement of ones and is selectively pulled down by mircocode instruction 1, by enabling appropriate pull down circuitry 160 diagrammatically shown in FIG. 2 to discharge selected lines of ALU bus 16 and to load a binary 6 into TMP B 142. A conventional comparator circuit 162 tests the contents of temporary register A to determine whetherd or not the contents is greater than 9. If so the output of comparator 162 is true and combined in OR gate 164 with the AUX-CARRY bit from PSW 136. The output of OR gate 164 enables adder 166 which then adds the contents of TMP A 138 and TMP B 142. The circuitry of FIG. 2 or its equivalent is included within ALU 134 and is enabled by the corresponding ALU opcode.

Microcode instruction 2 takes the contents of the sum from ALU 134 and reloads the sum into accumulator 90. ALU 134 is then preconditioned by the second half of microcode instruction 2 to decrement the contents of TMP B. The least significant bit of X register 108, X0, is then tested in microcode instruction 3, namely bit 3 of the instruction address. If true, the microcode instruction will follow a short jump to microcode instruction 5 wherein the contents of X register 82 will be loaded into register TMP B 142. ALU 134 having been preconditioned by microcode instruction 2, will decrement the contents of TEMP B 142. The second half of microcode instruction 5 will then cause a short jump to the end of the microcode instruction if the inverse of the carry flag is true indicating no carry, NCY, otherwise microcode instruction 6 will be executed wherein the sum will be placed in X register 82. In either case, the bookkeeping instruction will generate a ROM control signal, RNI, from circuit 144 to run the next instruction, i.e. indicate to loader 130 to run the next machine language instruction.

If, however, an ASCII add instruction is indicated, microcode instruction 3 will be omitted and ALU 134 preconditioned to increment contents of TMP B. Again, microcode instruction 5 will insert the contents of temporary register 82 into TMP B with the result that the incremented contents of X register 82 may be loaded into X register 82 as required and an ASCII multiplication division. Hardware circuitry performs the other remaining operations required in the ASCII addition and subtraction adjustment, such as setting the auxiliary carry flag by the use of pull up circuitry 168 in combining the sum with hexidecimal OF in AND gate 170 shown in FIG. 2. The logical equivalent circuitry employed by the ASCII addition and subtraction has been shown diagrammatically in FIG. 2. However, it is to be understood that the circuitry is for the purposes of illustration only and represents an equivalent to the way in which general purpose circuitry within ALU 134 performs the required hardwired logical operations in a manner well known to the art. It it is to be understood that the actual circuitry may have a distinct architecture and only assumes an equivalent configuration to that of FIG. 2, in response to the microcode instructions discussed above.

The ASCII division and multiplication adjustment instructions, AAM and AAD, are diagrammatically illustrated below in TABLE 8.

TABLE 8

|      | X | 7 | 6 | 5 | 4 | 3 | 2 | 1 | 0 | CR | S | D | Typ | a | b | F |
|------|---|---|---|---|---|---|---|---|---|----|---|---|-----|---|---|---|
| AAM  | 0 | 1 | 1 | 0 | 1 | 0 | 1 | 0 | 0 | 0  | Q | tmpb | | | | |
|      |   |   |   |   |   |   |   |   |   | 1  | ZERO | tmpa | | | | |
|      |   |   |   |   |   |   |   |   |   | 2  | A | tmpc | 7 | UNC | 3 | |
|      |   |   |   |   |   |   |   |   |   | 3  |   |   | 1 | COM1 | tnpc | |
| ASCF | 0 | 1 | 1 | 0 | 1 | 0 | 1 | 0 | 0 | 4  | Σ | X | 1 | PASS | tmpa, NX | |
|      |   |   |   |   |   |   |   |   |   | 5  | Σ | A | 4 | none | RNI | F |
|      |   |   |   |   |   |   |   |   |   | 6  |   |   |   |   |   |   |
|      |   |   |   |   |   |   |   |   |   | 7  |   |   |   |   |   |   |
| INCR, DECR | 0 | 0 | 1 | X | 0 | X | X | X | X | 0 | M | tmpb | 1 | X1 | tmpb, NX | |
|      |   |   |   |   |   |   |   |   |   | 1  | Σ | M | 4 | none | RNI | |
|      |   |   |   |   |   |   |   |   |   | 2  |   |   |   |   |   |   |
| CORX |   |   |   |   |   |   |   |   |   | 3  | ZERO | tmpa | 1 | RRCY | tmpc | |

TABLE 8-continued

|      | X | 7 | 6 | 5 | 4 | 3 | 2 | 1 | 0 | CR | S | D       | Typ | a    | b    | F |
|------|---|---|---|---|---|---|---|---|---|----|---|---------|-----|------|------|---|
|      | 0 | 0 | 1 | X | 0 | X | X | X | X | 4  | Σ | tmpc    | 4   | MAXC | none |   |
|      |   |   |   |   |   |   |   |   |   | 5  |   |         | 0   | NCY  | 8    |   |
|      |   |   |   |   |   |   |   |   |   | 6  |   |         | 1   | ADD  | tmpa |   |
|      |   |   |   |   |   |   |   |   |   | 7  | Σ | tmpa    |     |      |      | F |
|      | 0 | 0 | 1 | X | 0 | X | X | X | X | 8  |   |         | 1   | RRCY | tmpa |   |
|      |   |   |   |   |   |   |   |   |   | 9  | Σ | tmpa    | 1   | RRCY | tmpc |   |
|      |   |   |   |   |   |   |   |   |   | 10 | Σ | tmpc    | 0   | NCZ  | 5    |   |
|      |   |   |   |   |   |   |   |   |   | 11 |   |         | 4   | none | RTN  |   |
| CORD | 1 | 0 | 0 | 1 | 0 | 0 | 0 | 1 | 0 | 0  |   |         | 1   | SUBT tmpa |  |   |
|      |   |   |   |   |   |   |   |   |   | 1  | Σ | no dest | 4   | MAXC | none | F |
|      |   |   |   |   |   |   |   |   |   | 2  |   |         | 5   | NCY  | 7    |   |
|      |   |   |   |   |   |   |   |   |   | 3  |   |         | 1   | LRCY | tmpc |   |
|      | 1 | 0 | 0 | 1 | 0 | 0 | 0 | 1 | 0 | 4  | Σ | tmpc    | 1   | LRCY | tmpa |   |
|      |   |   |   |   |   |   |   |   |   | 5  | Σ | tmpa    | 1   | SUBT | tmpa |   |
|      |   |   |   |   |   |   |   |   |   | 6  |   |         | 0   | CY   | 13   |   |
|      |   |   |   |   |   |   |   |   |   | 7  | Σ | no dest |     |      |      | F |
|      | 1 | 0 | 0 | 1 | 0 | 0 | 0 | 1 | 0 | 8  |   |         | 0   | NCY  | 14   |   |
|      |   |   |   |   |   |   |   |   |   | 9  |   |         | 0   | 0    | NCZ  | 3 |
|      |   |   |   |   |   |   |   |   |   | 10 |   |         | 1   | LRCY | tmpc |   |
|      |   |   |   |   |   |   |   |   |   | 11 | Σ | tmpc    |     |      |      |   |
|      | 1 | 0 | 0 | 1 | 0 | 0 | 0 | 1 | 0 | 12 | Σ | no dest | 4   | none | RTN  |   |
|      |   |   |   |   |   |   |   |   |   | 13 |   |         | 4   | RCY  | none |   |
|      |   |   |   |   |   |   |   |   |   | 14 | Σ | tmpa    | 0   | NCZ  | 3    |   |
|      |   |   |   |   |   |   |   |   |   | 15 |   |         | 0   | UNC  | 10   |   |

As shown for AAD in TABLE 3, the 8 bit binary number for 10 is drawn from the queue as the second byte of the instruction and placed within the TMP C 140. The contents of X register 82 is placed within TMP B 142. The unconditional long jump is then made to CORX, which in the presently preferred embodiment is a portion of an increment and decrement instruction. Microcode instructions 3 through 11 and CORX represent the execution of the normal binary multiplication alogorithm wherein the TMP A is used as an accumulator. The ALU opcode, RRCY, stands for a right rotation including the carry. The carry is included since ALU 134 of the present invention is able only to test the carry bit rather than one selected bit of the byte or word. Thus, microcode instruction 3 of CORX clears temporary register A and preconditions ALU 134 to right rotate the contents of temporary register C. The actual rotation occurs at microcode instruction 4. In the second half of microcode instruction 4 a bookkeeping instruction sets an internal counter in ALU 134, well known to the art, to either 15 or 7 depending upon whether the quantity operated upon is a byte or word.

As will be seen below the counter is then decremented as a multiplication algorithm is continued. Microcode instruction 5 is a short conditional jump in which the carry bit is tested. If there is no carry then the jump will be made to microcode instruction 8. The last half of microcode instruction 8 and the first half of microcode instruction 9 will right rotate with the carry the contents of temporary register A followed by the right rotation with carry of the contents of register TMPC. In the last half of microcode instruction 10 a short conditional jump is made whenever the condition, NCZ, indicates that the contents of the counter within ALU 134 has reached zero. If the contents is not zero the loop returns ot microcode instruction 5. At the end of the loop return is made to the microcode burst pertaining to AAD wherein the contents of A register 90 are loaded into temporary register B 142 and ALU 134 is preconditioned to add the contents of temporary register B and temporary register C which now holds the product of 10 times the prior contents of X register 82. At microcode instruction 3,X register 82 is then zeroed and an unconditional jump is made to ASCF wherein the addition, preconditioned by microcode instruction 2, is executed in ALU 134 the flags updated and the ROM control signal, RNI generated. Comparison with TABLE 3 will indicate that this is in fact the ASCII adjustment for division.

Similarly, TABLE 8 also shows the ASCII adjustment for multiplication, AAM. The binary number for 10 is pulled from the queue and loaded into temporary register B in microcode step 0. Temporary register A is cleared at microcode instruction 1 and the contents of accumulator 90 loaded into temporary register C at microcode instruction 2 after which there is an unconditional jump to the subroutine CORD which is comprised of a 16 microcode burst.

The first microcode instruction of CORD preconditions ALU 134 to subtract the contents of temporary register B from temporary register A and executes the subtraction at microcode instruction 1 without setting the results at any location. The carry flag is also set. Therefore, if the contents of temporary register B is a zero, it being assumed that all contents are of positive numbers, no carry will be generated inasmuch as temporary register A has been cleared. In such a case, at microcode instruction 2, a conditional jump NCY to a conventional error subroutine, will flag to the user that division by zero is being attempted. Normally the carry flag will be set at microcode instruction 1. As before the bookkeeping instruction MAX C will set the contents of an internal counter within ALU 134 to 15 or 7 depending upon whether byte or word quantities are being manipulated. A left rotation with carry is then executed upon the contents of temporary register C at microcode instructions 3 and 4. The result is that the set carry bit is left rotated into temporary register C which initially held the dividend. Similarly, the set carry bit is rotated into temporary register A which was previously zeroed by microcode instructions 4 and 5. ALU 134 is preconditioned to subtract the contents of temporary register B from temporary register A in the second half of microcode instruction 5. The carry bit is tested in a microcode instruction 6, but will be zero on the first pass, since a zero bit will have been shifted into the carry bit from the zeroed contents of temparary register A. The subtraction is executed in microcode instruction 7 without the differences being placed anywhere. However, the carry bit flag is updated. If the divisor held in temporary register B, is greater than the contents of temporary register A, which has now been rotated, the carry bit will be set thus the conditional jump NCY and microcode instruction 8 will be passed through. Microcode instruction 9 carries a short jump back to microcode instruction 3 together with the decrement of the internal counter within ALU 134.

The process is continued in like manner until the shifted contents of temporary register A is equal to or exceeds the divisor held in temporary register B. However, if the carry bit has been set by the shifting of a binary 1 into the carry bit as a result of the left rotational shift beginning in microcode instruction 4 from temporary register A, microcode instruction 6 will cause a jump to microcode instruction 13 which will reset the carry bit. The difference between the divisor and dividend will be put into temporary register A in microcode instruction 14 with a return in the second half of that instruction ot microcode instruction 3. If a binary 1 has not been rotated into the carry bit, microcode instruction 6 will be passed through and the subtraction executed at microcode instruction 7 as before. If the dividend is equal to or greater than the divisor, a carry flag will be reset at instruction 7 with the result of a conditional jump at instruction 14 where again the sum is set into temporary register A and the loop continued.

At the end of the loop either from instruction 9 or 14, instruction 10 will be entered directly or through an unconditional jump at instruction 15 to perform an additional left rotation with the carry on the contents of temporary register C. The contents of temporary register C is reloaded into ALU 134 at instruction 12 and complemented in the main microcode routine for AAM at microcode instruction 3. The complemented contents of temporary register C, which is now the quotient of 10 divided into the dividend, is loaded into X register 82. ALU 134 is preconditioned to pass the contents of temporary register A and loads its contents at microcode instruction 5 into the accumulator register 90. The carry flag is then updated and a run next instruction signal, RNI, is generated. Comparison with TABLE 3 will show that the routine for AAM is in fact executed by the microcode burst described above.

The microcode subroutines for the string instructions, MOVS and LDS, executed according to the present invention are listed below in TABLE 9.

Each of the string instructions starts with a long jump on the condition F1 which is true when the repeat prefix, RPT, described above, has been just previously decoded. When present, the repeat subroutine, RPTS, will be entered which will cause the string instruction to be repeated the number of times as set forth in the contents of register BC.

The string MOVE and string LOAD commands, MOVS and LDS, are shown as sharing the same microcode burst. In microcode instruction 1 the contents of IJ registers 102 are moved to indirect register 44 in upper file 48. A memory read instruction is then executed. The addressing subroutine, well known to the art, will then take the address from IND 44 and read the contents into the operand register OPR 46. Bits 17 through 20 contain a code to indicate which relocation register to apply and an address factor to correct the address in IND register 44 after it is used. BL symbolically represents a two bit code which causes external logic to examine the byte or word line and the direction flag in PSW register 136 to generate, according to random logic well known to the art, the address factor required. The address factor will selectively increment or decrement the address contents of IND 44 by one or two depending on whether one or two bytes were involved in the access.

In microcode instruction 2 the X0 bit of register 108 will be true if the instruction is a string load in which case there is a short conditional jump to microcode instruction 6. Microcode instruction 6 loads the contents of OPR register 46, which now contains the contents of the address location accessed and moves the same to M register 104. In the last half of microcode instruction 6 there is a conditional short jump back to the zeroeth instruction should there be a repeat prefix, otherwise the RNI signal is generated.

If the instruction is a string move then the conditional jump from microcode instruction 2 is passed through and the contents of IK register 105 is loaded into the indirect register IND 44. A memory write operation occupies the last half of microcode instruction 3 again employing the two bit address correction factor utilizing the w or word/byte input from the instruction together with the PSW direction flag to make a post correction in IND by the correct increment or decrement. After the increment or decrement is made, the result is moved from IND register 44 to IK register 105 and a conditional jump made upon the existence of a repeat prefix, otherwise the RNI signal is generated.

Similarly, TABLE 10 shows that the string compare,

TABLE 9

|  | X | 7 | 6 | 5 | 4 | 3 | 2 | 1 | 0 | CR | S | D | Typ | a | b | F |
|---|---|---|---|---|---|---|---|---|---|----|---|---|-----|---|---|---|
| MOVS LDS | 0 | 1 | 0 | 1 | 0 | X | 1 | 0 | X | 0 |  |  | 7 | F1 | 1 | |
|  |  |  |  |  |  |  |  |  |  | 1 | IJ | IND | 6 | R | DD,BL | |
|  |  |  |  |  |  |  |  |  |  | 2 | IND | IJ | 0 | X0 | 6 | |
|  |  |  |  |  |  |  |  |  |  | 3 | IK | IND | 6 | w | DA,BL | |
|  | 0 | 1 | 0 | 1 | 0 | X | 1 | 0 | X | 4 | IND | IK | 0 | F1 | 0 | |
|  |  |  |  |  |  |  |  |  |  | 5 |  |  | 4 | none | RNI | |
|  |  |  |  |  |  |  |  |  |  | 6 | OPR | M | 0 | F1 | 0 | |
|  |  |  |  |  |  |  |  |  |  | 7 |  |  | 4 | none | RNI | |

CMPS, and string search, SRCHS, share the same microcode burst.

TABLE 10

|  | X | 7 | 6 | 5 | 4 | 3 | 2 | 1 | 0 | CR | S | D | Typ | a | b | F |
|---|---|---|---|---|---|---|---|---|---|----|---|---|-----|---|---|---|
| CMPS SRCHS | 0 | 1 | 0 | 1 | 0 | X | 1 | 1 | X | 0 |  |  | 7 | F1 | 1 | |
|  |  |  |  |  |  |  |  |  |  | 1 | (M) | tmp2 | 0 | X0 | 5 | |

TABLE 10-continued

| X | 7 | 6 | 5 | 4 | 3 | 2 | 1 | 0 | CR | S | D | Typ | a | b | F |
|---|---|---|---|---|---|---|---|---|----|---|---|-----|---|---|---|
|   |   |   |   |   |   |   |   |   | 2  | IJ | IND | 6 | R | DD,BL | |
|   |   |   |   |   |   |   |   |   | 3  | IND | IJ | | | | |
| 0 | 1 | 0 | 1 | 0 | X | 1 | 1 | X | 4  | OPR | tmpa | | | | |
|   |   |   |   |   |   |   |   |   | 5  | IK | IND | 6 | R | DA,BL | |
|   |   |   |   |   |   |   |   |   | 6  | OPR | tmpb | 1 | SUBT | tmpa | |
|   |   |   |   |   |   |   |   |   | 7  | Σ | no dest | | | | F |
| 0 | 1 | 0 | 1 | 0 | X | 1 | 1 | X | 8  | IND | IK | | | | |
|   |   |   |   |   |   |   |   |   | 9  | | | 0 | FIZZ | 0 | |
|   |   |   |   |   |   |   |   |   | 10 | | | 4 | none | RNI | |
|   |   |   |   |   |   |   |   |   | 11 | | | | | | |

As before, the zeroeth instruction is a long jump conditioned upon a repeat prefix. The microcode instruction 1 moves the contents of M register 104 to temporary register A followed by a conditional jump to microcode instruction 5 if the X0 bit of register 108 is true indicating that the instruction is a string search. The contents of IK register 105 is then loaded into IND register 44 followed by a memory read employing the w bit and direction bit address correction factor described above. The contents of the memory cell accessed is now stored in OPR register 46 and is moved to temporary register B. ALU 134 is preconditioned in microcode instruction 6 to subtract the contents of temporary register B from temporary register A. The operation is executed in microcode instruction 7 wherein the carry flag is updated. In the microcode instruction 8 the contents of IND register 44, which now contains the post corrected address, is moved back to IK register 105. At microcode instruction 9 a short jump is conditioned upon the logical product of the zero flag being preset to zeroeth and the repeat prefix being present. In the case that this occurs, the sequence is repeated by returning to the zero microcode instruction, otherwise the RNI signal is generated. Thus, the contents of the addressed memory location is compared to the quantity loaded into the register pointed at by M register 104, which in the case of a string search, will be accumulator 90.

Similarly, the string compare will pass through the conditional short jump at microcode instruction 1 and load the contents of IJ register 103 into IND register 44. A memory read cycle will then be executed using the RD relocation register and the two bit w and direction bit code for a post correction address factor. The post corrected address is then taken from IND register 44 at microcode instruction 3 and reloaded into IJ register 103. The contents of the accessed memory location is then loaded into temporary register A in microcode instruction 4. Contents of the IK register 105 is loaded into IND register 44 with another memory read cycle using the RA relocation register and the w and direction bit for post address correction with the result that the contens of the accessed memory cell is loaded into OPR register 46. At microcode instruction 6 the contents of OPR register 46 is then moved to temporary register B and ALU 134 preconditioned to subtract temporary register B from temporary register A. The operation is executed at microcode instruction 7 wherein the flags are set, including the zero flag. Thus, the difference between the contents of the memory location pointed at by IK register 105 and IJ register 103 is set up in ALU 134. If the difference is zero, the zero flag will be preset to a binary zero. Microcode instruction 8 restores the post corrected address in IND register 44 to IK register 105 followed by a conditional short jump at microcode instruction 9 if there was both a repeat prefix and a nonzero compare, otherwise the RNI signal is generated at microcode instruction 10.

Finally, TABLE 11 illustrates the string store instruction, STS, which is comprised of a four microcode burst.

TABLE 11

| | X | 7 | 6 | 5 | 4 | 3 | 2 | 1 | 0 | CR | S | D | Typ | a | b | F |
|---|---|---|---|---|---|---|---|---|---|----|---|---|-----|---|---|---|
| STS | 0 | 1 | 0 | 1 | 0 | 1 | 0 | 1 | X | 0 | IK | IND | 7 | F1 | 1 | |
|   |   |   |   |   |   |   |   |   |   | 1 | (M) | OPR | 6 | w | DA,BL | |
|   |   |   |   |   |   |   |   |   |   | 2 | IND | IK | 0 | F1 | 0 | |
|   |   |   |   |   |   |   |   |   |   | 3 | | | 4 | none | RNI | |

In the zeroeth instruction the contents of IK register 105 are moved to IND register 44 followed by a long jump conditioned upon the existence of a repeat prefix. At microcode instruction 1, the contents of the register pointed at by M register 104, which in the present embodiment is accumulator 90, is moved to OPR register 46. A memory write cycle using relocation register RA and the direction and w bit post-address correction factor is then executed. In the cases of a memory write cycle the address is placed in IND register 44 with the data to be written being placed in OPR register 46 during or prior to the memory write word. Thus, the data from accumulator 90 is written into the memory location pointed at by IK register 105. The post-corrected address in IND register 44 is then moved back to IK register 105 and microcode instruction 2 followed by a conditional short jump to the zeroeth instruction if a repeat prefix is found, otherwise the RNI signal is generated.

The repeat prefix, RPTS, includes a microcode burst used as a conditional subroutine throughout each of the string compare instructions. The repeat microcode subroutine is shown in TABLE 12.

TABLE 12

| | X | 7 | 6 | 5 | 4 | 3 | 2 | 1 | 0 | CR | S | D | Typ | a | b | F |
|---|---|---|---|---|---|---|---|---|---|----|---|---|-----|---|---|---|
| XLAT | 0 | 1 | 1 | 0 | 1 | 0 | 1 | 1 | 1 | 0 | ZERO | tmpa | | | | |
|   |   |   |   |   |   |   |   |   |   | 1 | XA | tmpaL | | | | |
|   |   |   |   |   |   |   |   |   |   | 2 | HL | tmpb | 1 | ADD | tmpa | |
|   |   |   |   |   |   |   |   |   |   | 3 | Σ | IND | 6 | R | DD,P0 | |

TABLE 12-continued

| | X | 7 | 6 | 5 | 4 | 3 | 2 | 1 | 0 | CR | S | D | Typ | a | b | F |
|---|---|---|---|---|---|---|---|---|---|---|---|---|---|---|---|---|
| | 0 | 1 | 1 | 0 | 1 | 0 | 1 | 1 | 1 | 4 | OPR | A | 4 | none | RNI | |
| | | | | | | | | | | 5 | | | | | | |
| RPTS | | | | | | | | | | 6 | BC | tmpb | 0 | INT | 12 | |
| | | | | | | | | | | 7 | | | 1 | PASS | tmpb | |
| | 0 | 1 | 1 | 0 | 1 | 0 | 1 | 1 | 1 | 8 | Σ | no dest | 1 | DEC | tmpb | |
| | | | | | | | | | | 9 | | | 0 | ZU | 11 | |
| | | | | | | | | | | 10 | Σ | BC | 4 | none | RTN | |
| | | | | | | | | | | 11 | | | 4 | none | RNI | |
| | 0 | 1 | 1 | 0 | 1 | 0 | 1 | 1 | 1 | 12 | | | 4 | none | SUSP | |
| | | | | | | | | | | 13 | | | 4 | none | CORR | |
| | | | | | | | | | | 14 | PC | tmpb | 1 | DEC2 | tmpb | |
| | | | | | | | | | | 15 | Σ | | 4 | FLUSH | RNI | |

Beginning with microcode instruction 6, the contents of BC register 84 and 92 are loaded into temporary register B followed by a conditional interrupt jump should an external interrupt be received. The conditional jump to microcode instruction 12, which is a bookkeeping instruction, causes upper control unit 12 to stop doing the instruction fetches thereby stopping the program counter. The next bookkeeping instruction causes upper control unit 12 to recompute a real program counter by subtracting the number of bytes in the queue from the then existing program counter and reloading the same back into the program counter. This is accomplished by random logic hardware well known to the art. The true program counter contents are then moved to temporary register B and ALU 134 preconditioned to decrement the contents of temporary register B by two, corresponding to the word length. The contents of TMP B is decremented in microcode instruction 15 and replaced into the program counter. The bookkeeping instruction, FLUSH, restarts the queue and erases all bytes currently in the Q, restarts from the contents of the current program counter, and generates the RNI signal.

If however, there is no interrupt signal, ALU 134 is conditioned to pass through the contents of temporary register B at microcode instruction 7 and then to decrement the contents of temporary register B at microcode instruction 8. A short conditional jump at microcode instruction 9 will occur to microcode instruction 10 if the contents is zero, otherwise the decremented count is reloaded into BC register 84 and 92 followed by a return to the call point. If the contents is zero, microcode instruction 11 is executed by generation of the RNI signal.

It should be noted that the immediate instructions contained an l bit as discussed above. The l bit indicates that when operating on a 16 bit quantity whether the immediate data is 8 or 16 bits. Memory read instructions employing an l bit contain as one microcode instruction the following instruction pair as the first two instructions of the microcode burst.

| 0 | Q | TMP | BL | 0 | L8 | 2 |
|---|---|---|---|---|---|---|
| 1 | Q | TMP | BH | | | |
| 2 | | | | ... | | |
| . | | | | | | |
| . | | | | | | |

Namely, a bit is taken from the queue and put into the least significant bits of temporary register B. ALU 134 then automatically extends, by conventional means, the sign bit of the least significant byte to the 8 most significant bits of the 16 bit register. A conditional short jump is then executed to the remaining microcode instructions of the burst if the l bit has been set, i.e. L8. Otherwise, the next byte from the queue will be loaded into the most significant bits of temporary register B and the microcode instruction burst continued. Thus, in a 16 bit instruction, i.e. w=1, a signal L8 will be decoded in ROM 116 and logically combined in an AND function with the l bit. The signal is tested in a microcode instruction to either load a second byte or to extend the sign of a single byte immediate data in the immediate instructions.

Although the present invention has been described in conjunction with specific instructions, it must be understood that these instructions are discussed primarily as a characterization of the apparatus and method of using the apparatus of the present invention. A full instruction set is provided in the ROMS, decoders, registers and circuitry and is included within the spirit and scope of the present invention. Thus, it must be understood that many other modifications and alterations may be made to the invention as disclosed herein without departing from the breadth scope of the following claims.

What then been herein disclosed is a central processor which is equally adept at manipulating 8 or 16 bit quantities without duplication or repetition of hardware. In addition, the processor may address an extended memory space which exceeds the addressable space as defined by the maximum word lengths with the registers of the microprocessor. Data throughput is drammatically increased by providing for an instruction overlap in combination with the queue whereby microprocessor is provided with asynchronously running upper and lower control units. The organization of the present invention further allows several classes of unique instructions which are able to execute complex functions with minimum amounts of software or microcode programming without sacrafice of versatility and generality.

We claim:

1. In a microprocessor chip, a data processing system for use with a memory external to the chip comprising;
upper control means for transferring digital information to and from said memory; and
lower control means for processing said digital information wherein the operation of said upper and lower control means are overlapping and asynchronous;
wherein said upper control means includes a file of registers, and wherein said file includes a plurality of registers forming an ordered, first-in-first-out queue of registers, and digital information in the nature of instructions obtained from said memory are temporarily stored in said queue until requested by said lower control means for execution.

2. The data processing system of claim 1 wherein said lower control means includes:

an instruction register coupled to said queue;

a group decode ROM having its inputs coupled to said instruction register, said group decode ROM generating a plurality of group decode signals indicative of the length of said single byte and multiple byte instructions;

a microcode address register having inputs coupled to said queue;

a microcode address incrementing register;

a microcode ROM for storage of a multiplicity of microcode instructions and having inputs coupled to said microcode address register and outputs selectively coupled to a first and second file of registers and an arithmetic and logic unit including a plurality of temporary registers; and loader means for selectively enabling and loading a byte from said queue into said instruction register and microcode address register, and enabling said microcode address incrementing register and microcode ROM, said loader means having a plurality of states, said microcode ROM including a ROM-OUT control means for selectively generating a next-to-last-clock signal, NXT, on the next-to-the last clock of a selected plurality of said multiplicity of microcode instructions to trigger said loader means to recycle through at least part of said plurality of states, whereby operation of said loader means and microcode ROM are overlapped such that instruction decoding of a subsequent instruction occurs simultaneously with execution of at least the last clock of said selected plurality of said multiplicity of microcode instructions corresponding to said prior instruction.

3. The data processing system of claim 2 further including:

a subroutine translation ROM having inputs coupled to said queue and to said outputs of said microcode ROM, said subroutine translation ROM having outputs coupled to said microcode address register and microcode address incrementing register to load therein a selected microcode address in response to predetermined ones of said outputs of said microcode ROM and in response to a selected bit field (mode, r/m) of a second byte of said multiple byte instructions; and an ALU opcode register having inputs coupled to said queue and outputs coupled to an arithmetic and logic unit included within said lower control means to temporarily store a predetermined bit field from said single byte and multiple byte instructions while said microcode ROM is communicating ALU opcode instructions to said arithmetic and logic unit in response to said second byte of said single byte and multiple byte instructions, whereby an address subroutine may be selectively called and entered to calculate an operand address in memory.

4. The data processing system of claim 3 wherein said upper and lower control means has an upper and lower file respectively of single and multiple byte registers, said upper and lower file of registers being selectively coupled by a bus having separate bus lines equal in number to at least the number of bit locations in said multiple byte registers, selected ones of said upper and lower file of registers being selectively coupled to said bus as a source and a destination register by a plurality of bus registers in response to said single byte and multiple byte instructions, said bus registers each decoding a predetermined bit field of the first byte of a multiple byte instruction to generate a probabilistically correct source and destination assignment and each decoding a predetermined bit field of a second byte of a multiple byte instruction to correct said probabilistic assignment if in error.

5. The data processing system of claim 1 wherein said processing of digital information by said lower control means includes execution of an instruction and simultaneously decoding of a subsequent instruction.

6. The data processing system of claim 1 wherein said upper and lower control means process single byte and multiple byte instructions, said upper and lower control means having an upper and lower file respectively of single byte and multiple byte registers, said upper and lower file of registers being selectively coupled by a bus having a plurality of separate bus lines equal in number to at least the number of bit locations in said multiple byte registers, selected ones of said upper and lower files of registers being selectively coupled to said bus as a source and a destination register by a plurality of bus registers in response to said single byte and multiple byte instructions, whereby portions of said lower control means may be commonly employed to selectively execute both single byte and multiple byte instructions.

7. The data processing system of claim 6 wherein said bus registers include decoding circuitry to generate a plurality of source and destination codes from bit fields in said single byte and multiple byte instructions.

8. The data processing system of claim 6 wherein said lower control means includes destination crossover means for selectively designating in response to a bit field in said single byte and multiple byte instructions one of said plurality of bus registers as identifying said source and another one of said plurality of bus registers as identifying said destination.

* * * * *